(12) United States Patent
Hunt et al.

(10) Patent No.: US 7,026,992 B1
(45) Date of Patent: Apr. 11, 2006

(54) METHOD FOR CONFIGURING A LOCAL POSITIONING SYSTEM

(75) Inventors: Kenneth Edward Hunt, Rock Hill, SC (US); Mark Alvin Schmidt, Charlotte, NC (US); David Roy Holm, Oconomowoc, WI (US); Scott Adam Stephens, Phoenix, AZ (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/096,001

(22) Filed: Mar. 31, 2005

(51) Int. Cl.
*G01S 3/02* (2006.01)

(52) U.S. Cl. ........................ 342/465; 342/463

(58) Field of Classification Search ............... 342/450, 342/451, 463, 465; 455/456.1, 456.6
See application file for complete search history.

(56) References Cited

U.S. PATENT DOCUMENTS

| | | | |
|---|---|---|---|
| 4,710,020 A | 12/1987 | Maddox et al. | |
| 4,829,442 A | 5/1989 | Kadonoff et al. | |
| 4,833,480 A | 5/1989 | Palmer et al. | 342/125 |
| 4,873,449 A | 10/1989 | Paramythioti et al. | |
| 5,307,271 A * | 4/1994 | Everett et al. | 701/24 |
| 5,375,059 A | 12/1994 | Kyrtsos et al. | |
| 5,390,125 A | 2/1995 | Sennott et al. | |
| 5,438,517 A | 8/1995 | Sennott et al. | |
| 5,491,476 A * | 2/1996 | DiBella | 340/933 |
| 5,610,815 A | 3/1997 | Gudat et al. | |
| 5,640,323 A | 6/1997 | Kleimenhagen et al. | |
| 5,657,226 A | 8/1997 | Shin et al. | |
| 5,657,317 A | 8/1997 | Mahany et al. | |
| 5,874,918 A | 2/1999 | Czarnecki et al. | |
| 5,933,079 A | 8/1999 | Frink | |
| 5,982,164 A | 11/1999 | Czarnecki et al. | |
| 5,986,602 A | 11/1999 | Frink | |
| 6,011,974 A | 1/2000 | Cedervall et al. | |
| 6,072,421 A | 6/2000 | Fukae et al. | |
| 6,125,135 A | 9/2000 | Woo et al. | |
| 6,212,448 B1 | 4/2001 | Xydis | |
| 6,424,264 B1 | 7/2002 | Giraldin et al. | |
| 6,427,079 B1 | 7/2002 | Schneider et al. | |
| 6,459,966 B1 | 10/2002 | Nakano et al. | |

(Continued)

FOREIGN PATENT DOCUMENTS

CA 1271546 7/1990

OTHER PUBLICATIONS

H. Edelsbruneer and T.S. Tan, *Quadratic time algorithm for the minmax length triangulation*, Proceedings of the 32nd Annual Symposium on Foundations of Computer Science, pp. 414-423, 1991, San Juan Puerto Rico.

(Continued)

*Primary Examiner*—Dao Phan

(57) ABSTRACT

A method for configuring a local positioning system comprises orienting a survey antenna coextensively with a primary beacon associated with a work area. A transmitter or transceiver transmits a first transmission signal from the survey antenna. A receiver or transceiver receives the first transmission at one or more secondary beacons associated with the work area. A data processor determines first elapsed times from the transmission time of the first transmission signal to at least the arrival time at respective corresponding secondary beacons. Each of the first elapsed times falls within a filtering time window, or satisfies an edge timing criteria of the coded signal, or both to reduce multi-path error. The first elapsed times are converted into a first position in at least two spatial dimensions for the primary beacon.

21 Claims, 19 Drawing Sheets

U.S. PATENT DOCUMENTS

| | | |
|---|---|---|
| 6,489,917 B1 | 12/2002 | Geisheimer et al. |
| 6,556,942 B1 | 4/2003 | Smith |
| 6,614,721 B1 | 9/2003 | Bokhour .................... 367/128 |
| 2001/0022506 A1 | 9/2001 | Peless et al. |
| 2001/0027360 A1 | 10/2001 | Nakano et al. |
| 2001/0051527 A1 | 12/2001 | Kuwahara et al. |
| 2002/0097181 A1 | 7/2002 | Chou et al. |
| 2003/0005030 A1 | 1/2003 | Sutton et al. |
| 2003/0007473 A1 | 1/2003 | Strong et al. |
| 2004/0032363 A1 | 2/2004 | Schantz et al. |
| 2005/0002481 A1 | 1/2005 | Woo et al. |

OTHER PUBLICATIONS

F. van Diggelen and A. Brown, *Mathematical Aspects of GPS Raim*, IEEE Position Location and Navigation Symposium, pp. 733-738, 1994, Las Vegas, NV, USA.

* cited by examiner

US 7,026,992 B1

METHOD FOR CONFIGURING A LOCAL POSITIONING SYSTEM

FIELD OF THE INVENTION

This invention relates to a method for configuring a local positioning system.

BACKGROUND OF THE INVENTION

A local positioning system refers to any system that uses terrestrial transmissions of electromagnetic signals (e.g., radio frequency or microwave) to estimate a location of an object or vehicle in a work area. The estimated location of an object or vehicle in a work area may be inaccurate because multi-path reflections may be mistaken for direct free-space or line of sight propagation between the wireless devices of a local positioning system. Further, a local positioning system may not provide accurate measurements of the location of an object or a vehicle, unless the reference locations of the wireless devices are properly determined. Accordingly, there is need to reduce inaccuracies in local positioning systems by reducing the potentially deleterious effects of multi-propagation and deficient installations of wireless devices of the local positioning system.

SUMMARY OF THE INVENTION

In accordance with one aspect of the invention, a method for configuring a local positioning system comprises orienting a survey antenna coextensively with a primary beacon associated with a work area. A mobile transmitter or mobile transceiver transmits a first transmission signal from the survey antenna. A receiver or transceiver receives the first transmission at one or more secondary beacons associated with the work area. A data processor determines first elapsed times from the transmission time of the first transmission signal to at least the arrival time at respective corresponding secondary beacons. Each of the first elapsed times falls within a filtering time window or satisfies an edge timing criteria of the coded signal, or both to reduce multi-path error. The first elapsed times are converted into a first position in at least two spatial dimensions for the primary beacon.

BRIEF DESCRIPTION OF THE DRAWINGS

Like reference numbers in any of the drawings indicate like elements.

DESCRIPTION OF THE PREFERRED EMBODIMENT

Figure 1A:
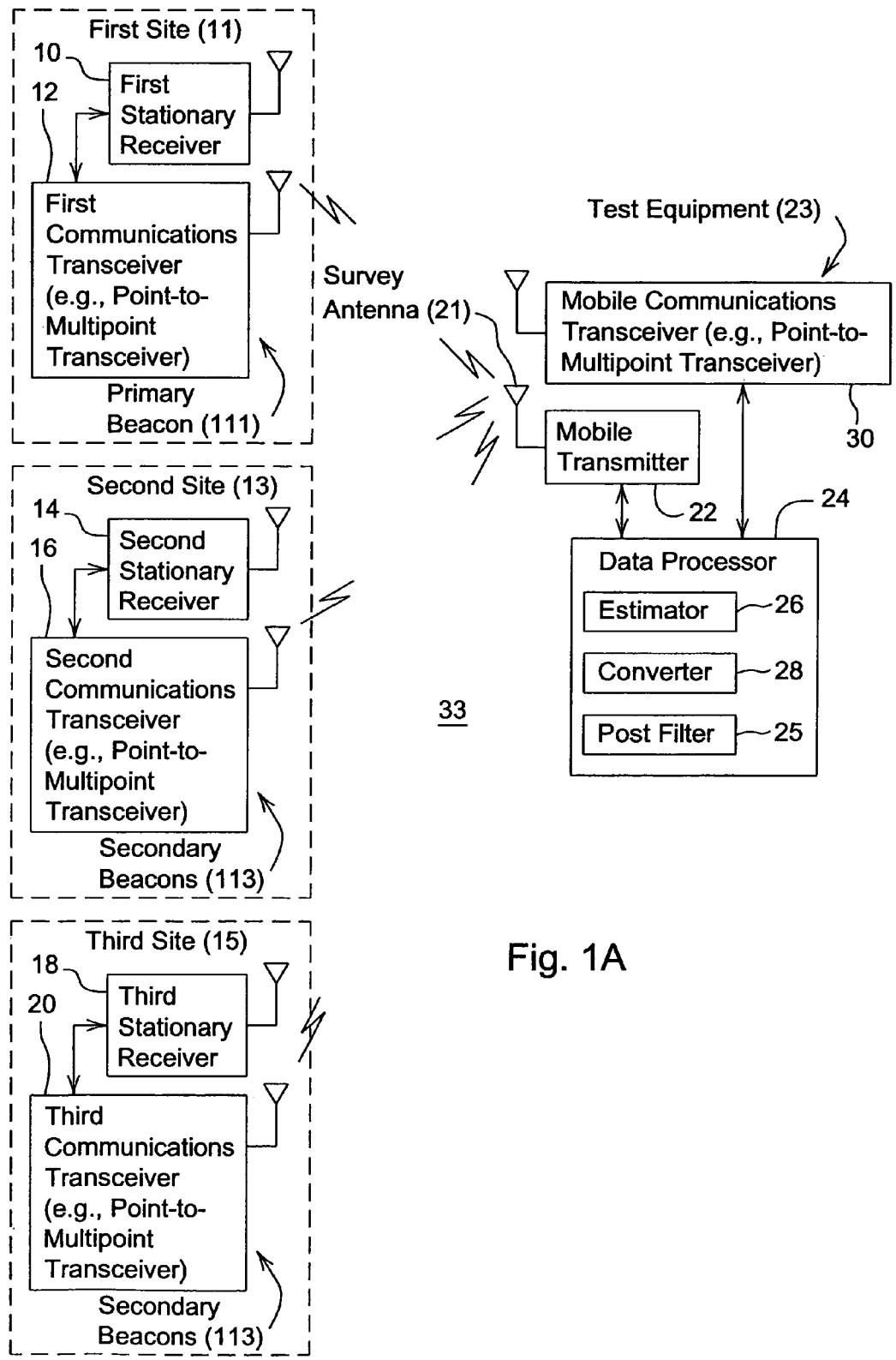
FIG. 1A is a block diagram of a first embodiment of a local positioning system that features location processing at test equipment during a configuration stage.

FIG. 1A illustrates a first embodiment of the local positioning system 33 in a configuration stage. The configuration stage refers to a stage prior to an operational stage in which the local positioning system is used to determine or estimate a location (e.g., geographic coordinates) of a mobile object or a mobile vehicle in the work area. During the configuration stage, the locations (e.g., geographic coordinates) of a group of beacons (111, 113) is determined.

In accordance with the first embodiment, the local positioning system 33 comprises a primary beacon 111 associated with a first site 11 and second beacons 113 associated with other sites, such as a second site 13 and a third site 15. The primary beacon 111 comprises a first stationary receiver 10 coupled to a first communications transceiver 12. One secondary beacon 113 comprises a combination of a second stationary receiver 14 and a second communications transceiver 16. Another secondary beacon 113 comprises a combination of the third stationary receiver 18 and the third communications transceiver 20. Secondary beacons 1–13 refer collectively to beacons at the second site 13 and the third site 15.

In one embodiment, test equipment 23 comprises a mobile transmitter 22 coupled to a survey antenna 21 and a data processor 24. In turn, the data processor 24 communicates with a mobile communications transceiver 30. The mobile transmitter 22 is capable of transmitting a transmission signal (e.g., an identifiable pulse or pulse train) to two or more of the following receivers: a first stationary receiver 10, a second stationary receiver 14, and a third stationary receiver 18.

The receivers (10, 14, and 18) are capable of receiving the transmission signal (e.g., identifiable pulse or pulse train) transmitted by the mobile transmitter 22. The first stationary receiver 10 is coupled to a first communications transceiver 12 at the first site 11; the second stationary receiver 14 is coupled to a second communications transceiver 16 at the second site 13; and the third stationary receiver 18 is coupled to a third communications transceiver 20 at the third site 15.

The communications transceivers (12, 16, 20 and 30) comprise a first communications transceiver 12, a second communications transceiver 16, a third communications transceiver 20, and a mobile communications transceiver 30. The communications transceivers (12, 16, 20, and 30) may communicate with one another via one or more electromagnetic signals (e.g., radio frequency or microwave signals).

In one embodiment, each communications transceiver (12, 16, 20, and 30) comprises a point-to-multipoint transceiver.

In another embodiment, each communications transceiver (12, 16, 20, and 30) comprises a point-to-point transceiver which may allow communications between a first site 11, the second site 13, and the third site 15. For example, if the transceivers are point-to-point transceivers with multiple channels, the communications transceivers may be arranged in a ring to permit at least one dedicated communications channel between any two sites. Further, any communications transceiver may provide a communications channel between any site and the mobile communications transceiver 30.

In one example, the communications transceivers (12, 16, 20, and 30) may exchange the following types of data: elapsed times, position data, and clock synchronization data, for example. In another example, in a turn-around ranging mode each beacon may act as a repeater that receives the transmission signal from the mobile transmitter 22 and transmits a return signal (derived from or associated with the transmission signal) back to the mobile communications transceiver 30 or test equipment 23. Although it is not technically necessary to bring the signal down to a baseband or intermediate frequency (IF), if the signal is down-converted or brought to a baseband or IF processing and modulation of the return signal may be executed to improve system performance (e.g. by interference reduction between co-channel transmissions). The transmission and reception at each beacon may be configured on different frequencies, different time slots, or with different codes to avoid co-channel interference, although co-channel transmission and reception are possible with sufficient spatial isolation between transmit and receive signals.

During the configuration stage, the test equipment 23 or data processor 24 is used to ascertain the position or geographic coordinates of the first site 11, the second site 13, and the third site 15 (or antennas associated therewith) by interacting with the primary beacon 111 and secondary beacons 113. At the test equipment 23, the mobile communications transceiver 30, the mobile transmitter 22, and the data processor 24 are co-located. In one embodiment, the data processor 24 comprises an estimator 26 and a converter 28. A data processor 24 or estimator 26 determines elapsed times (e.g., one-way duration or round-trip duration) from the transmission time of the transmission signal (e.g., an identifiable pulse or pulse train) to the arrival time at respective corresponding secondary beacons 113. For example, the elapsed time may represent a round-trip propagation time comprising an outgoing propagation time associated with an outgoing signal (or transmission signal) from the mobile transmitter 22 to any stationary receiver (10, 14 or 18) and an incoming propagation time associated with an incoming signal from the co-located communications transceiver (e.g., 12, 16, or 20) back to the mobile communications transceiver 30.

The transmission time from the mobile transmitter 22, the transmission time from a communications transceiver (12, 16, or 20) or both may be associated with an identifiable pulse, a distinguishable modulation, or an identifiable code (e.g., a portion of a pseudo-random noise code or a temporally long coding sequence). The reception time of a stationary receiver (10, 14, or 18) or the reception time of a mobile communications transceiver 30 may be associated with the corresponding identifiable pulse, a distinguishable modulation, or the identifiable code that was transmitted. The difference between the transmission time and the reception time is used to determine the elapsed time or location of the beacons during the configuration stage and the position of a mobile vehicle during the operational mode.

In one embodiment, the elapsed times are converted into a first position in at least two spatial dimensions (e.g., x and y coordinates of a Cartesian coordinate system) for the primary beacon 111, a second position in at least two spatial dimensions for one secondary beacon 113, and a third position in at least two spatial dimensions for another secondary beacon 113 (or the antennas associated with each beacon). The data processor 24 or converter 28 can convert the elapsed time or propagation times into a corresponding distances or radii (e.g., from the survey antenna 21). For example, the data processor 24 may estimate the distance between the survey antenna 21 and the antenna associated with any site (11, 13 or 15) based on the following equation: distance=c*t, where $c=3\times10^8$ meters/seconds (speed of light), t=elapsed time or propagation time, and distance is distance in meters. In one configuration, the proportional relationship between distance and the propagation time may be fined tuned with a minor adjustment based on empirical measurements or tests, or based on the temperature, humidity, and frequency of the signal, for example. If the round trip propagation time is used as the elapsed time, the distance (d) is divided by two to obtain the distance or radius between the survey antenna 21 at one site and the beacons at the other sites. Further, there may be a time or distance deduction for bias or processing lag within each beacon, particularly where the turn-around ranging mode or repeating function of the beacons is used.

The data processor 24 may be associated with a post-filter 25 that rejects locations, coordinates, and elapsed times that are inconsistent with the geographic scope or boundaries of the work area. The geographic scope or boundaries of the work area may be inputted as coordinates associated with a perimeter of the work area, dimensions of the work area, or another description of the work area inputted by a user. For example, the shape, geometry, or dimensions of the work area or the relative spatial separation between beacons (e.g., mounted beacons in fixed locations) may be determined by survey equipment (e.g., optical survey equipment, laser survey equipment, a laser range finder), measurement equipment, or otherwise.

The post-filter 25 may eliminate positions or location estimates that are caused by unwanted reflections or multipath propagation that are inconsistent with an upper-bound propagation time for the elapsed time. The upper-bound propagation time or maximum propagation time refers to a maximum duration for the elapsed time based on a maximum spatial separation of beacons or maximum dimensions of the work area, whichever is greater. For example, in a polygonal work area, the upper-bound propagation time may be generally proportional to the maximum separation of beacons located coincidentally or proximately to a perimeter of the work area on opposite sides of the polygonal work area (e.g., baseball stadium, a sports stadium, a field, a golf course, or a construction area).

In a configuration stage, the lower-bound propagation time or minimum propagation time refers to a duration of a generally direct line-of-site or minimally obstructed propagation path between minimally separated beacons (or their antennas) within the work area or located coincidentally or proximately to a perimeter of a work area, where a received signal exceeds a threshold signal strength, a threshold signal-to-noise ratio or a threshold signal quality level. The threshold signal strength, threshold signal-to-noise ratio or threshold signal quality level exceeds that of a multipath or indirect reflected signal by a margin determined by tests or empirical measurements in the particular work area, for example. In an operational stage which is later described in conjunction with FIG. 4A, the lower-bound propagation time or minimum propagation time refers to a duration of a generally direct line-of-site or minimally obstructed propagation path between any beacon and a vehicle, where the received-signal exceeds a threshold signal strength, a threshold signal-to-noise ratio, a threshold signal quality level of one or more beacons or receiver modules 66.

Figure 1B:
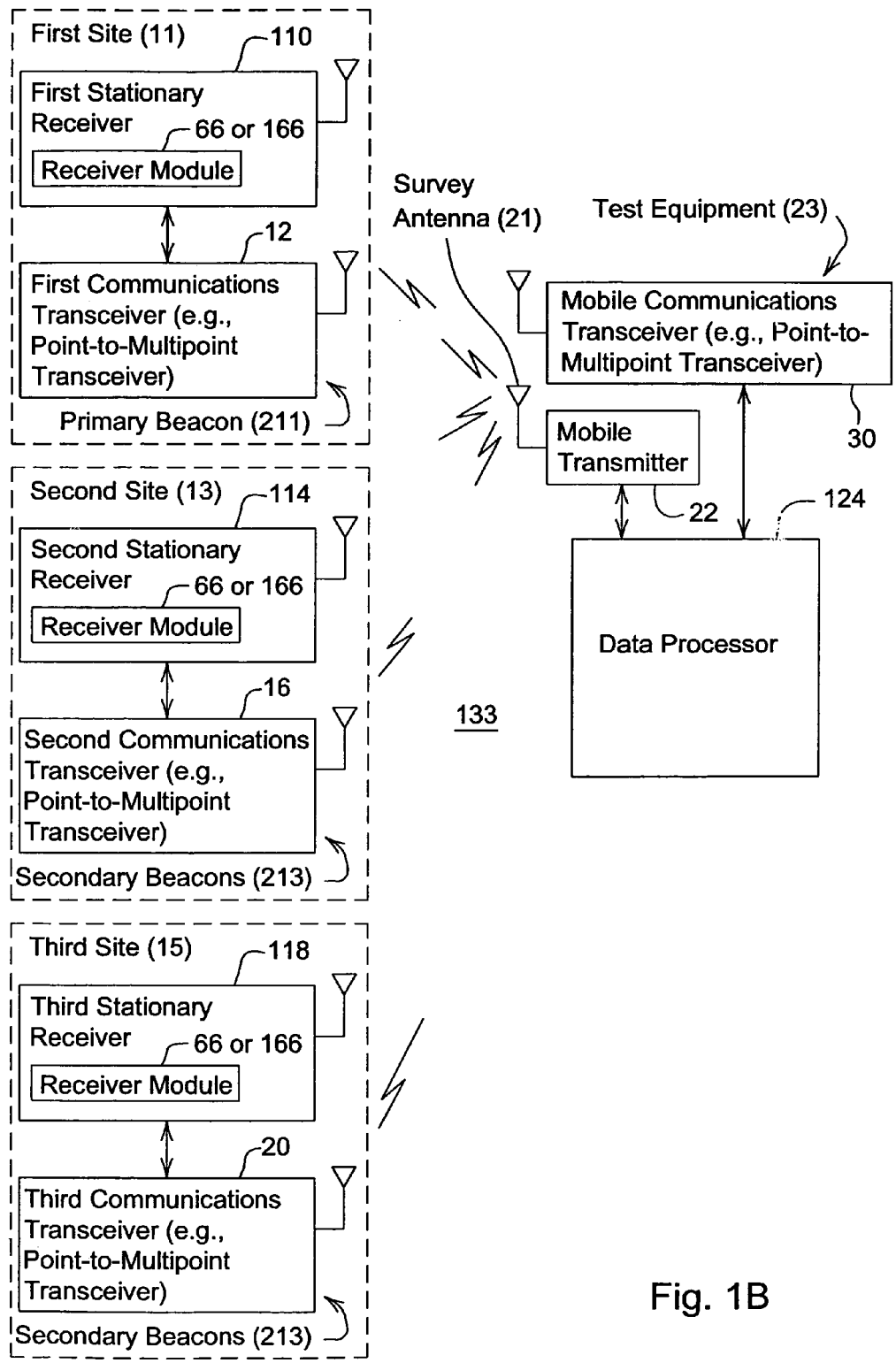
FIG. 1B is a block diagram of a second embodiment of a location positioning system that features location processing at beacons during a configuration stage.

The local positioning system 133 of FIG. 1B is similar to the local positioning system 33 of FIG. 1A. However, the local positioning system 133 of FIG. 1B replaces the first stationary receiver 10, the second stationary receiver 14, and the third stationary receiver 18 with the first stationary receiver 110, the second stationary receiver 114, and the third stationary receiver 118. Further, the local positioning system 133 of FIG. 1B replaces the data processor 24 with the data processor 124.

The first stationary receiver 110, the second stationary receiver 114, and the third stationary receiver 118 each comprise receiver modules (66 or 166). The receiver modules (66 or 166) are described later in greater detail in conjunction with FIG. 7 and FIG. 8. The receiver modules (66 or 166) determine elapsed times from the transmission time of the transmission signal (e.g., an identifiable pulse) by the mobile transmitter 22 to the arrival time at respective corresponding secondary beacons (211, 213). For example, the elapsed time may represent a one-way propagation time comprising an outgoing propagation time associated with an outgoing signal (or the transmission signal) from the survey antenna 21 of the mobile transmitter 22 to any stationary receiver (110, 114, or 118).

In one embodiment, each of the elapsed times is derived from a filtering process associated with the receiver module (66 or 166) or the data processor 124 to reduce multi-path error. The filtering process may apply time delay (e.g., of less than a chip duration), amplitude modification (e.g., attenuation or amplification), or both to the baseband signal or the modulated code signal to adjust the temporal alignment and duration of bits (e.g., chips or symbols). The elapsed times are converted into a first position in at least two spatial dimensions (e.g., x and y coordinates of a Cartesian coordinate system) for the primary beacon 211, a second position in at least two spatial dimensions for one secondary beacon 213, and a third position in at least two spatial dimensions for another secondary beacon 213. The data processor 124 can convert the elapsed time or propagation times into a corresponding distances or radii (e.g., with reference to the survey antenna). For example, the data processor 124 may estimate the distance based on the following equation: distance=$c*t$, where $c=3\times10^8$ meters/seconds (speed of light), t=elapsed time or propagation time, and distance is distance in meters. If the one-way trip propagation time is used between the mobile transmitter 22 and any stationary receiver (110, 114 or 118), the distance (d) represents the distance or radius between the survey antenna 21 at one site and the beacons (e.g., 213) at the other sites. Further, there may be a time or distance deduction for bias or processing lag within the receiver module (66 or 166) of each beacon.

In one embodiment, the transmission time of the mobile transmitter 22 is synchronized or aligned with respect to the reception time at each stationary receiver (110, 114, and 118) by the transmission of a clock synchronization data, phase data, or timing synchronization data. In another embodiment, the transmission time of the mobile transmitter 22 is synchronized or aligned with respect to the reception time at each stationary receiver by using precision clocks or precision oscillators (e.g., rubidium crystal oscillators) at the test equipment 23, the first site 11, the second site 13, and the third side 15. In yet another embodiment, it is possible that the mobile transmitter 22 transmits at pre-coordinated times (e.g., referenced to a common standard measure of time) known to the stationary receivers (110, 114, and 118) to synchronize or align the transmission time and reception time with respect to each other. The first communications transceiver 12, the second communications transceiver 16, and the third communications transceiver 20 may transmit elapsed times or position data, derived therefrom, to the test equipment 23 for subsequent processing by the data processor 24.

Figure 2A:
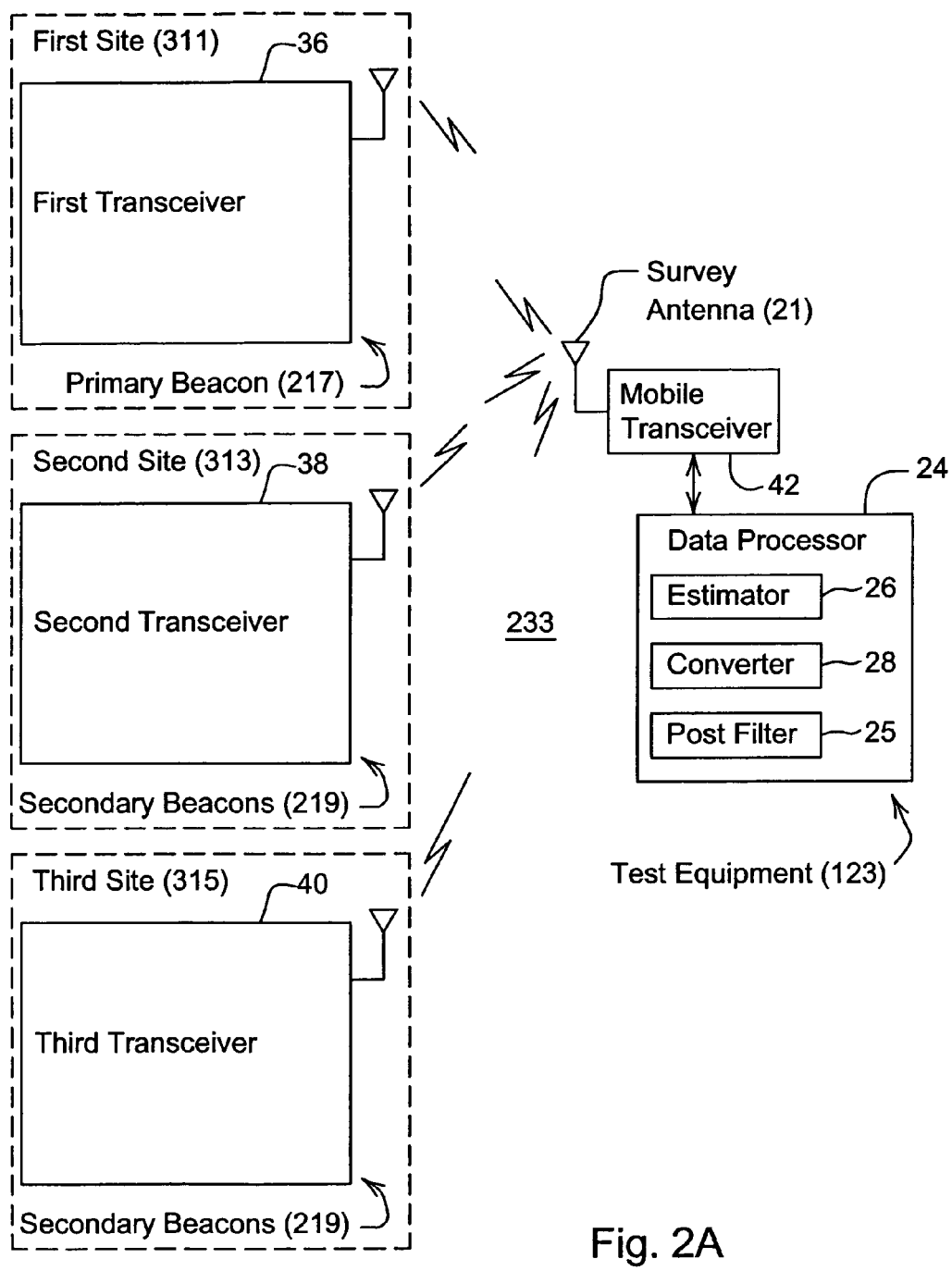
FIG. 2A is a block diagram of a third embodiment of a local positioning system that features location processing at test equipment during a configuration stage.

The local positioning system 233 of FIG. 2A is different from the local positioning system 33 of FIG. 1A with respect to the following items: (1) the local positioning system 233 of FIG. 2A replaces the first stationary receiver 10 and first communications transceiver 12 with the first transceiver 36; (2) the local positioning system 233 replaces the second stationary receiver 14 and the second communications transceiver 16 with the second communications transceiver 38; (3) the local positioning system 233 replaces the third stationary receiver 18 and the third communications transceiver 20 with the third transceiver 40; and (4) the local positioning system 233 replaces the combination of the mobile transmitter 22 and mobile communications transceiver 30 with the mobile transceiver 42. Like reference numbers in FIG. 1A and FIG. 2A indicate like elements.

In FIG. 2A, the first transceiver 36 is synonymous with the primary beacon 217 at the first site 311. The second transceiver 38 at the second site 313 and the third transceiver 40 at the third site 315 collectively refer to the secondary beacons 219. The first transceiver 36, the second transceiver 38, and the third transceiver 40 may each define two distinct communications channels: a first channel for receiving transmissions of the mobile transceiver 42 to estimate or determine a location of the mobile transceiver 42 (or its associated survey antenna 21) by the propagation time associated with the first channel; and a second channel for communicating data among the first site 311, the second site 313, and third site 315 via a point-to-multipoint or point to point communication. The first channel and the second channel may represent discrete physical channels separated by frequency or in the time domain (e.g., time division multiple access), or channels that are co-frequency or overlapping in time with distinguishable code assignments (e.g., code division multiple access or spread spectrum).

During the configuration stage, test equipment 123 or data processor 24 is used to ascertain the position or geographic coordinates of the first site 311, the second site 313, and the third site 315 (or antennas associated therewith) by interacting with the primary beacon 217 and secondary beacons 219. At the test equipment 123, the mobile transceiver 42 and the data processor 24 are co-located. The data processor 24 comprises an estimator 26 and a converter 28. A data processor 24 or estimator 26 determines elapsed times (e.g., one-way duration or round-trip durations) from the transmission time of the transmission signal to the arrival time at respective corresponding secondary beacons 219. For example, the elapsed time may represent a round-trip propagation time comprising an outgoing propagation time associated with an outgoing signal from the mobile transceiver 42 to any other transceiver (36, 38, or 40) and an incoming propagation time associated with an incoming signal from the transceiver (e.g., 36, 38 or 40) back to the mobile transceiver 42.

The post-filter 25 may reject certain round-trip propagation times that exceed a maximum round-trip propagation or upperbound limit for the geometry or dimensions of the work area, or maximum separation between different beacons consistent with the previous description of the post-filter in conjunction with FIG. 1A. The description of the post-filter 25 and its filtering process in conjunction with FIG. 1A applies equally to FIG. 2A as if fully set forth herein.

Figure 2B:
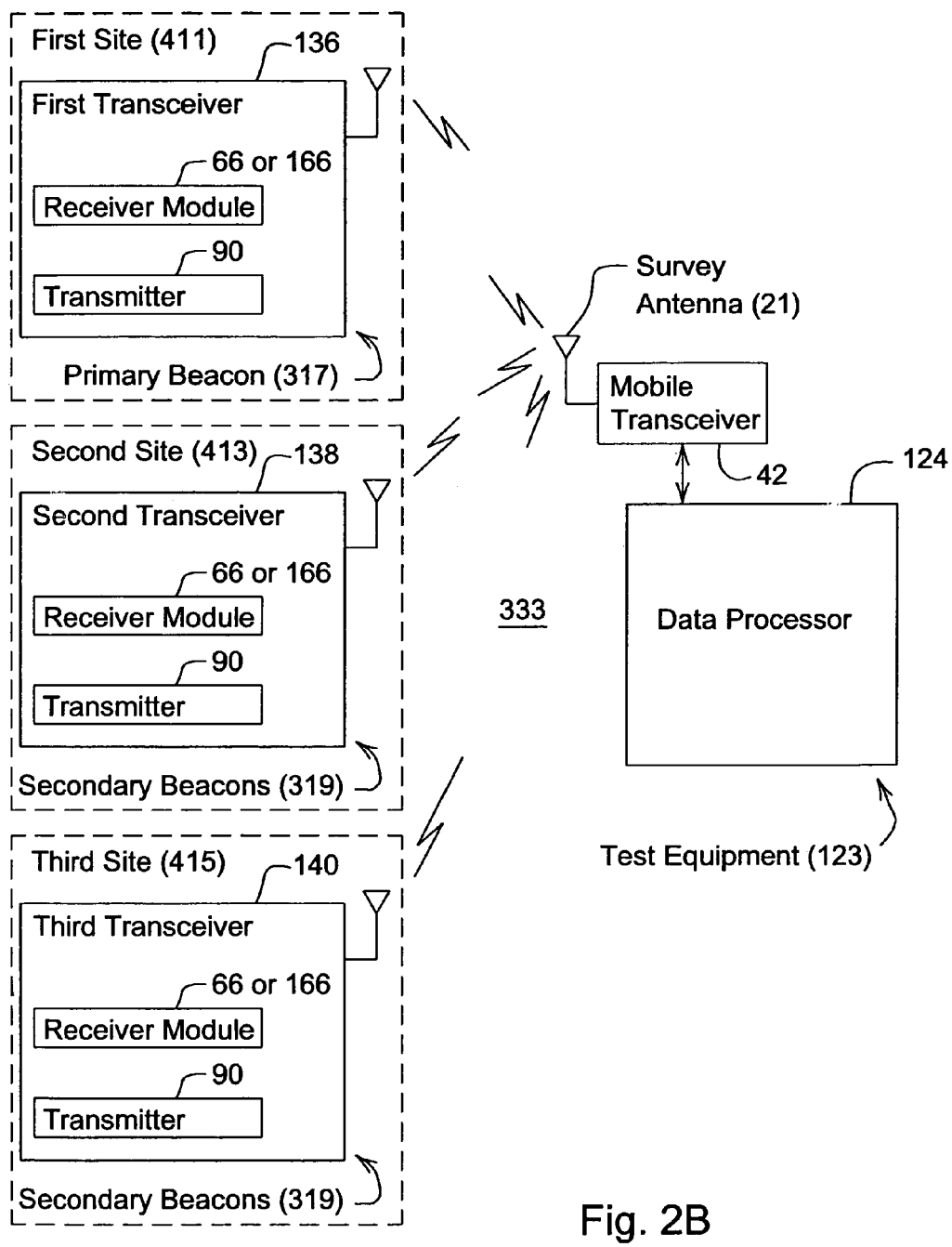
FIG. 2B is a block diagram of a fourth embodiment of a local positioning system that features location processing at beacons during a configuration stage.

The local positioning system 333 of FIG. 2B is similar to the local positioning system 233 of FIG. 2A. However, the local positioning system 333 of FIG. 2B replaces the first transceiver 36, the second transceiver 38, and the third transceiver 40 with the first transceiver 136, the second transceiver 138, and the third transceiver 140. Further, the local positioning system of FIG. 1B replaces the data processor 24 with the data processor 124.

The primary beacon 317 is located at the first site 411 and comprises the first transceiver 136. The secondary beacons 319 are located at the second site 413 and the third site 415. The secondary beacons 319 collectively comprise the second transceiver 136 and the third transceiver 140.

The first transceiver 136, the second transceiver 138, and the third transceiver 140 each comprise a receiver module (66 or 166) and a transmitter 90. The receiver modules (66 or 166) are described later in greater detail in conjunction with FIG. 7 and FIG. 8. The receiver modules (66 or 166) determine elapsed times from the transmission time of the transmission signal by the mobile transceiver 42 to the arrival time at respective receiver modules (66 or 166). For example, the elapsed time may represent a one-way propagation time comprising an outgoing propagation time associated with an outgoing signal from the mobile transceiver 42 to any other transceiver (136, 138, or 140).

In one embodiment, each of the elapsed times is derived from a filtering process associated with the receiver module (66 or 166) or the data processor 124 to reduce multi-path error. The elapsed times are converted into a first position in at least two spatial dimensions (e.g., x and y coordinates of a Cartesian coordinate system) for the primary beacon 317, a second position in at least two spatial dimensions for one secondary beacon 319, and a third position in at least two spatial dimensions for another secondary beacon 319. The data processor 124 can convert the elapsed time or propagation times into a corresponding distances or radii (e.g., with respect to the survey antenna 21). For example, the data processor 124 may estimate the distance based on the following equation: distance=c*t, where c=3×10$^8$ meters/seconds (speed of light), t=elapsed time or propagation time, and distance is distance in meters. If the one-way trip propagation time is used between the mobile transceiver 42 and any transceiver (136, 138 140), the distance (d) represents the distance or radius between the survey antenna 21 at one site and the beacons at the other sites. Further, there may be a time or distance deduction for bias or processing lag within the receiver module (66 or 166) of each beacon.

In one embodiment, the transmission time of the mobile transceiver 42 is synchronized or aligned with respect to the reception time at each transceiver (136, 138, or 140) by the transmission of clock synchronization data (e.g., clock synchronization data 34), phase data, or timing synchronization data. In another embodiment, the transmission time of the mobile transceiver 42 is synchronized or aligned with respect to the reception time at each stationary receiver by using precision clocks or precision oscillators (e.g., rubidium crystal oscillators) at the test equipment 123, the first site 411, the second site 413, and the third side 415. In yet another embodiment, the mobile transceiver 42 transmits at pre-coordinated times (e.g., with respect to a common measure of time) known to the transceivers (136, 138, and 140) to synchronize the transmission time and reception time.

Figure 3A:
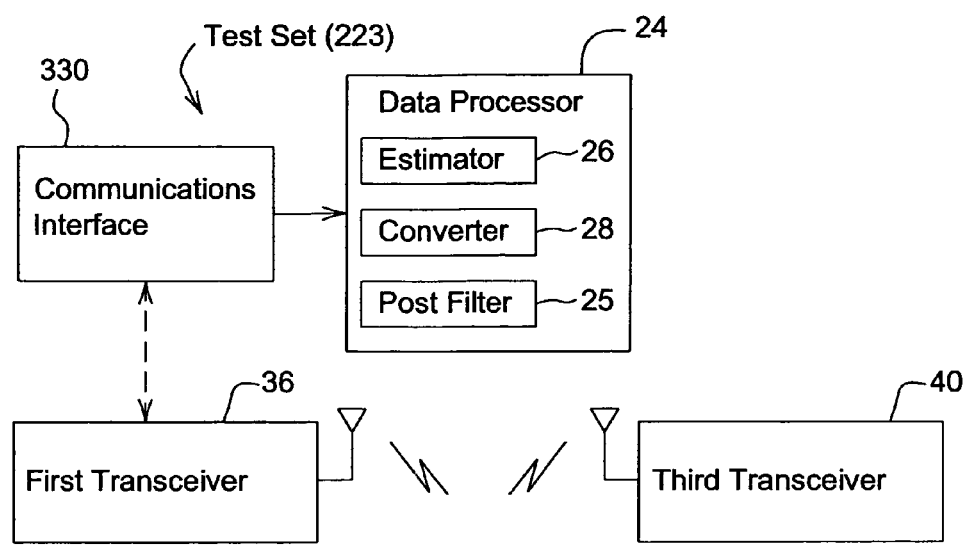
FIG. 3A is a block diagram of a fifth embodiment of a local positioning system that features location processing of a test set during a configuration stage.
Figure 3A:
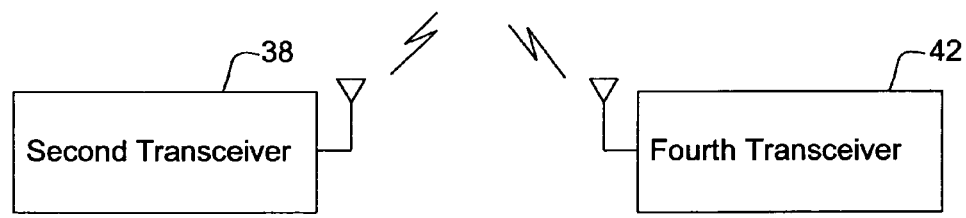

The local positioning system of FIG. 3A is similar to the local positioning system 233 of FIG. 2A, except the local positioning system of FIG. 3A replaces test equipment 123 with test set 223. Like reference numbers in FIG. 2A and FIG. 3A indicate like elements. The test set 223 comprises data processor 24 coupled to communications interface 330. Communications interface 330 supports wireless (e.g., Bluetooth) or wireline communications to the first transceiver 36, the second transceiver 38, the third transceiver 40, and the fourth transceiver 42. For example, the communications interface 330 may support communications with the transceivers (36, 38, 40 and 42) to facilitate estimation of a transmission time of a signal and the reception time of the signal. The data processor 24 is associated with a post-filter 25 for filtering or rejecting positions or propagation times for the sites that are distorted by multi-path propagation.

In one example, the first transceiver 36 transmits an outgoing signal from its antenna, as opposed to a survey antenna near or collocated to its antenna. The test set 223 may be connected to or arranged to communicate with the second transceiver 38. Each of the other transceivers (38, 40, and 42) receives the transmission signal (e.g., identifiable pulse or pulse train) and transmits an incoming signal back to the first transceiver 36. The data processor 24 or estimator 26 estimates the round-trip propagation time, which includes the outgoing propagation time and the incoming propagation time. The data processor 24 or converter 28 converts the round-trip propagation time to a distance or radii to establish the location of the antenna associated with the first transceiver 36.

Next, the second transceiver 38 transmits an outgoing signal from its antenna, as opposed to a survey antenna near or collocated to its antenna. Each of the other transceivers (36, 40, and 42) receives the signal and transmits an incoming signal back to the second transceiver 38. The data processor 24 or estimator 26 estimates the round-trip propagation time, which includes the outgoing propagation time and the incoming propagation time. The data processor 24 or converter 28 converts the round-trip propagation time to a distance or radii to establish the location of the antenna associated with the second transceiver 38. A similar process may be used to establish the positions of the antennas of the third transceiver 40 and fourth transceiver 42, respectively.

Figure 3B:
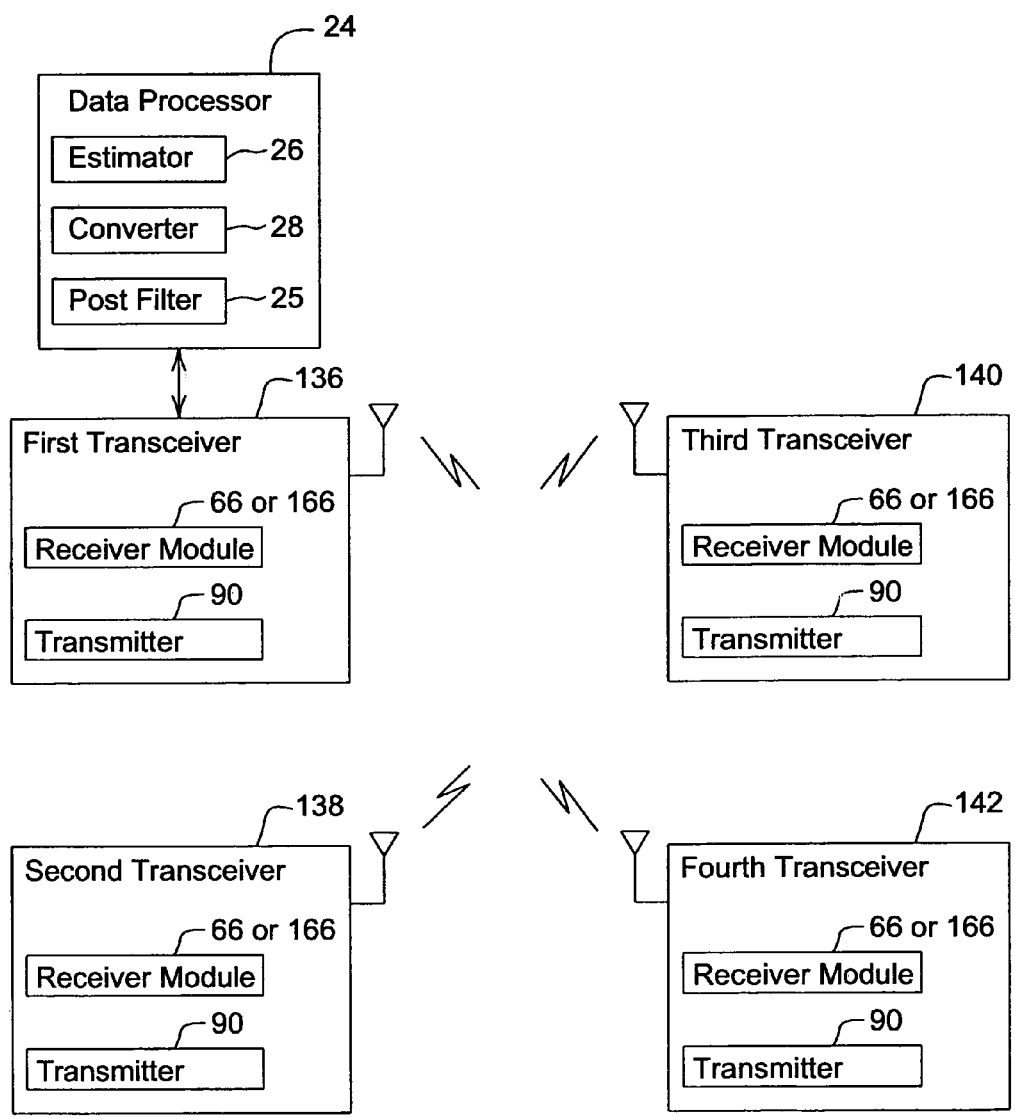
FIG. 3B is a block diagram of a sixth embodiment of a local positioning system that features location processing of beacons during a configuration stage.

The local positioning system of FIG. 3B is similar to the local positioning system of FIG. 3A, except the first transceiver 36 is replaced with the first transceiver 136, the second transceiver 38 is replaced with the second transceiver 138, the third transceiver 40 is replaced with the third transceiver 140, and the fourth transceiver 42 is replaced with the fourth transceiver 142. Further, the local positioning system of FIG. 3B excludes the test set 223, because its functions are subsumed within the transceivers (136, 138, 140, 142) and data processor 24. The first transceiver 136, the second transceiver 138, the third transceiver 140, and the fourth transceiver 142 each comprise a receiver module (66 or 166) and a transmitter 90.

The local positioning system of FIG. 3B comprises a data processor 24 associated with a controller for controlling transmissions or communications (e.g., sequence of transmissions over assigned time slots) between transceivers. Each transceiver transmits in a sequence or in accordance with the channel assignments and the non-transmitting transceivers receive the transmission to estimate the transmitting receiver's location (or the location of its associated antenna). First, for example, the first transmitter 90 or first transceiver 136 may transmit a transmission signal that is received by the second transceiver 138 at a first time, the third transceiver 140 at a second time, and the fourth transceiver 142 at a third time. The first time or first elapsed propagation time represents the difference between a transmission time from the transmission time at the first transceiver 136 and a reception time at the second transceiver 38. The receiver module (66 or 166) comprises data processing for estimating the first time or first elapsed propagation time. The receiver module (66 or 166) may further comprise a post filter 25 or another filter for filtering received signals to reduce or eliminate multipath reception and a converter 28 for converting the elapsed time into a corresponding distance. The second transceiver 138 may transmit or report the first time or first elapsed propagation time back to first transceiver 136 for processing by the data processor 24.

The third transceiver 140 determines the second time or second elapsed propagation time. The third transceiver 140 transmits the second time or second elapsed propagation time to the first transceiver 136 for processing by the data processor 24. The fourth transceiver 142 determines the third time or third elapsed propagation time. The fourth transceiver 142 transmits the third time or third elapsed propagation time to the first transceiver 136 for processing by the data processor 24. In one configuration, the data processor 24 at the first transceiver 136 uses the first time, second time, and third time to estimate a temporal indicator of the location of the first transceiver 136 (or its associated antenna). Further, the data processor 24 or converter 28 converts the elapsed propagation times or temporal indicator into corresponding distance estimates of the first site with the first transceiver 136 with respect to the other sites.

The above process is repeated until all-transceivers in the network transmit and the location of each transceiver (or its associated antenna) is determined by the data processor 24. This process establishes the site locations or fixed beacon locations that may be referenced subsequently during an operational stage to determine the location of a vehicle in a work area. Although each transceiver may be associated with a receiver module (66 or 166) for estimating location, to reduce the complexity of the electronics associated therewith, only one of the transceivers (e.g., the first transceiver 136) may be equipped with the data processing functionality of the data processor 24 and the other transceivers may forward data to the site with the data processor 24.

While the local positioning systems of FIG. 1A through FIG. 3B, inclusive, focus on the configuration stage where the reference locations of the fixed sites of beacons or transceivers is determined, the local positioning system of FIG. 4A through FIG. 6B, inclusive, is focused on the operational stage. During the operational stage, a vehicle is equipped with vehicle electronics for determining or estimating the location of the vehicle within a work area. The operational stage may reference the reference locations of the beacons (or their antennas) to determine or estimate a position or location of a vehicle. Like reference numbers in FIG. 1A through FIG. 6B indicate like elements.

Figure 4A:
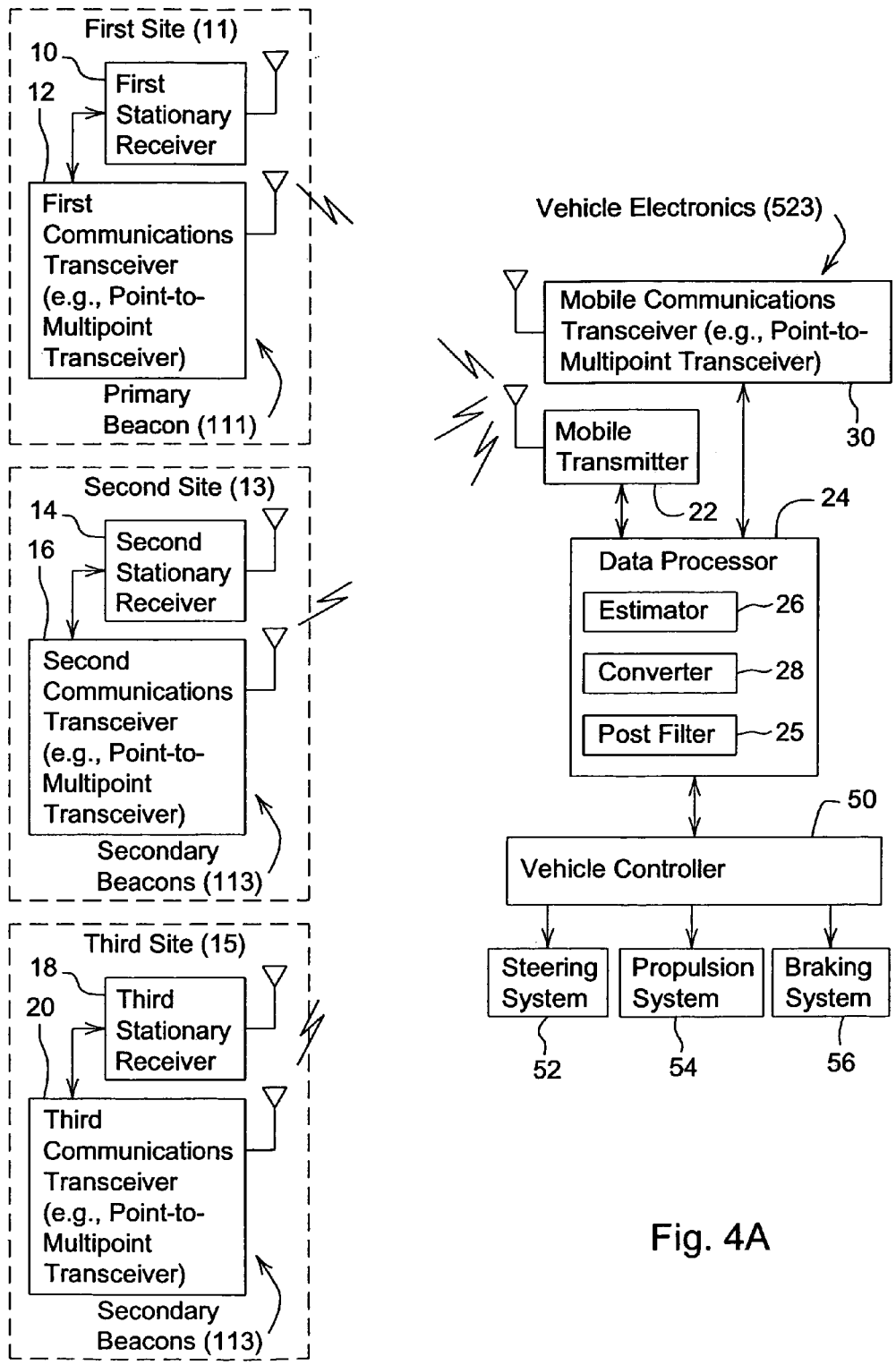
FIG. 4A is a block diagram of the first embodiment of the local positioning system during an operational stage.

In FIG. 4A, the vehicle electronics 523 comprises a mobile transceiver 22 coupled to a data processor 24. In turn, the data processor 24 is coupled to a vehicle controller 50. The vehicle controller 50 may send control signals or otherwise communicate with one or more of the following: a steering system 52, a propulsion system 54, and a braking system 56. The vehicle controller 50 may facilitate steering direction and control of the vehicles in a manned mode, an unmanned mode or otherwise.

The steering system 52 may comprise an electrically controlled hydraulic steering system, an electrically driven rack-and-pinion steering, an Ackerman steering system, or another steering system. The braking system 56 may comprise an electrically controlled hydraulic braking system, or another electrically controlled friction braking system. The propulsion system 54 may comprise an internal combustion engine, an internal combustion engine-electric hybrid system, an electric drive system, or the like.

The vehicle controller 50 may generate control signals for the steering system 52, the braking system 56 (if present), and a propulsion system 54 that are consistent with tracking a path plan. For example, the control signals may comprise a steering control signal or data message that is time dependent and defines a steering angle of the steering shaft; a braking control signal or data message that defines the amount of deceleration, hydraulic pressure, or braking friction applied to brakes; a propulsion control signal or data message that controls a throttle setting, a fuel flow, a fuel injection system, vehicular speed or vehicular acceleration. If the vehicle is propelled by an electric drive or motor, the propulsion control signal or data message may control electrical energy, electrical current, or electrical voltage to the electric drive or motor.

Once the locations (e.g., coordinates) of the first site 11, second site 13, and the third site 15 have been established in a configuration stage in FIG. 1A, those established reference locations of the sites are referenced or used in an operational stage to estimate a location (e.g., coordinates) of a mobile vehicle in the work area in FIG. 4A. The mobile transmitter 22 may transmit a transmission signal (e.g., a pulse or pulse train) that is received by the first stationary receiver 10 at a first outgoing propagation time, the second stationary receiver 14 at a second outgoing propagation time, and the third stationary receiver 18 at a third outgoing propagation time, where the propagation times depend upon the location of the vehicle in the work area and the established reference locations of the beacons. For a turnaround ranging configuration, the first communications transceiver transmits a first return signal (e.g., based on the received transmission signal) associated with a first incoming time propagation time back to the vehicle electronics 523 or mobile communications transceiver 30; the second communications transceiver 16 transmits a second return signal (e.g., based on the received transmission signal) associated with a second incoming time propagation time back to the vehicle electronics 523 or mobile communications transceiver 30; and the third communications transceiver 20 transmits a third return signal (e.g., based on the received transmission signal) associated with a third incoming time propagation time back to the vehicle electronics 523 or mobile communications transceiver 30. The data processor may determine derive elapsed times between the vehicle electronics 513 and each beacon or site-based on the round-trip propagation times (e.g., dividing the round-trip propagation time by two). The round trip propagation time associated with the first site 11 and the vehicle electronics 523 generally equals the sum of the first outgoing propagation time and the first incoming propagation time; the round trip propagation time associated with the second site 13 and the vehicle electronics 523 generally equals the sum of the second outgoing propagation time and the second incoming propagation time; the round trip propagation time associated with the third site 15 and the vehicle electronics 523 generally equals the sum of the third outgoing propagation time and the third incoming propagation time.

Figure 4B:
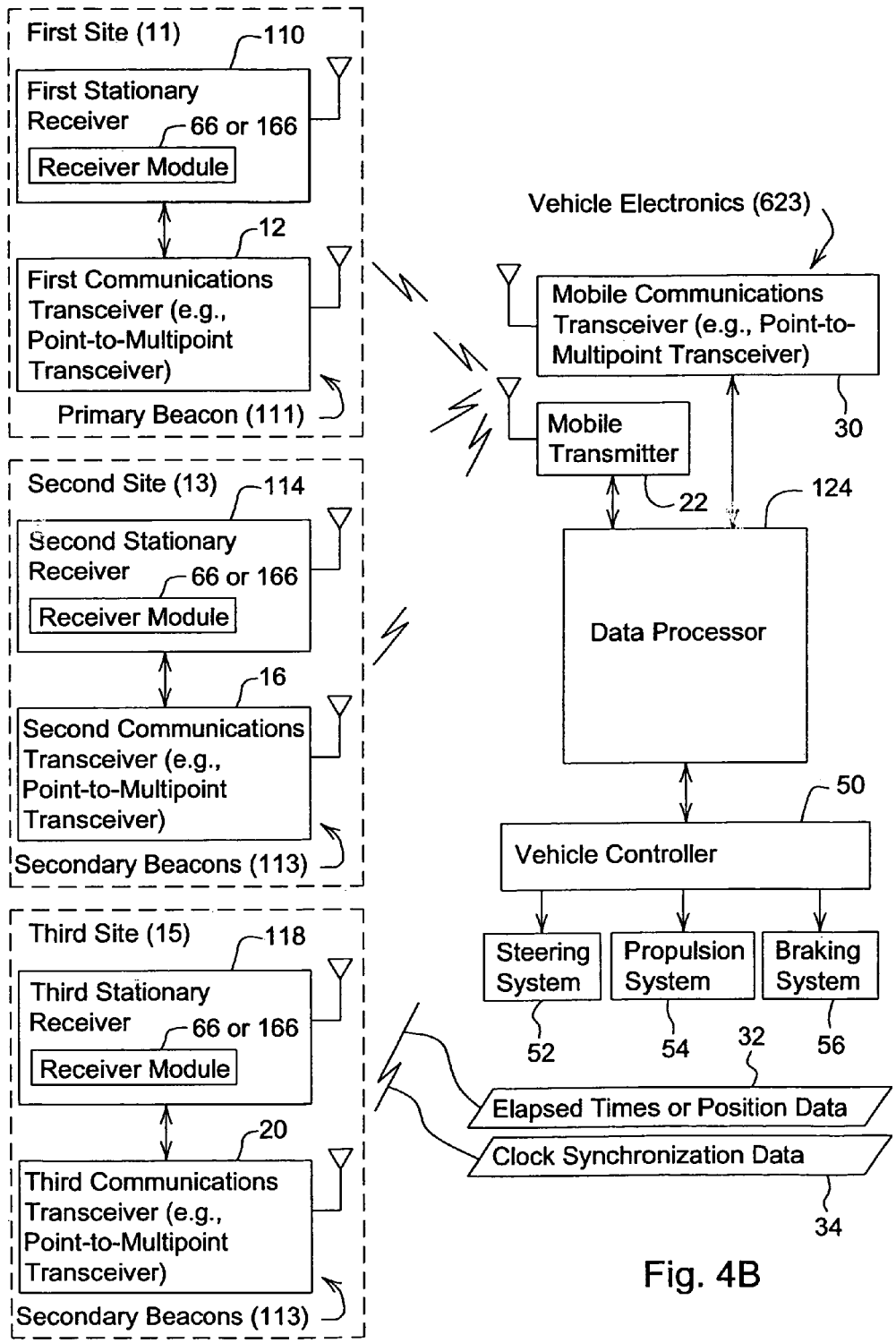
FIG. 4B is a block diagram of the second embodiment of the local positioning system during an operational stage.

In FIG. 4B, the vehicle electronics 623 are similar to the vehicle electronics 523 of FIG. 4A, except the vehicle electronics 623 replaces the data processor 24 with the data processor 124. Like reference numbers in FIG. 4A and FIG. 4B indicate like elements.

Once the locations (e.g., coordinates) of the first site 11, second site 13, and the third site 15 have been established in a configuration stage in FIG. 1B, those established locations of the sites are referenced or used in an operational stage to estimate a location (e.g., coordinates) of a mobile vehicle in the work area in FIG. 4B.

For a one-way ranging configuration, the mobile transmitter 22 may transmit a transmission signal (e.g., a pulse or pulse train) that is received by the first stationary receiver 110 at a first outgoing propagation time, the second stationary receiver 114 at a second outgoing propagation time, and the third stationary receiver 118 at a third outgoing propagation time, where the propagation times depend upon the location of the vehicle in the work area and the established reference locations of the beacons. In the one-way ranging mode, the first stationary receiver 110 or its receiver module (66 or 166) determines the first outgoing propagation time; the second stationary receiver 114 or its receiver module (66 or 166) determines the first outgoing propagation time; the third stationary receiver 118 or its receiver module (66 or 166) determines the first outgoing propagation time. The first outgoing propagation time, the second outgoing propagation time and the third outgoing propagation time may be referred to as elapsed times, or the individual or collective elapsed times may be converted into corresponding position data for the vehicle. Each beacon transmits elapsed time data, temporal data or position data indicative of the position of the vehicle to the vehicle electronics 623, In FIG. 5A, the vehicle electronics 723 are similar to the vehicle electronics 523 of FIG. 4A, except the vehicle electronics 723 replaces the mobile transmitter 22 with the mobile transceiver 42. Like reference numbers in FIG. 2A, FIG. 4A, and FIG. 5A indicate like elements. In FIG. 5B, the vehicle electronics 823 are similar to the vehicle electronics 523 of FIG. 5A, except the vehicle electronics 623 replaces the data processor 24 with the data processor 124. Further, the first transceiver 136 replaces the first transceiver 36; the second transceiver 138 replaces the second transceiver 38, and the third transceiver 140 replaces the third transceiver 40. Like reference numbers in FIGS. 2B, 5A and FIG. 5B indicate like elements.

Once the locations (e.g., coordinates) of the first site 411, second site 413, and the third site 415 have been established in a configuration stage in FIG. 2B, those established locations of the sites are referenced or used in an operational stage to estimate a location (e.g., coordinates) of a mobile vehicle in the work area in FIG. 5B.

Figure 5A:
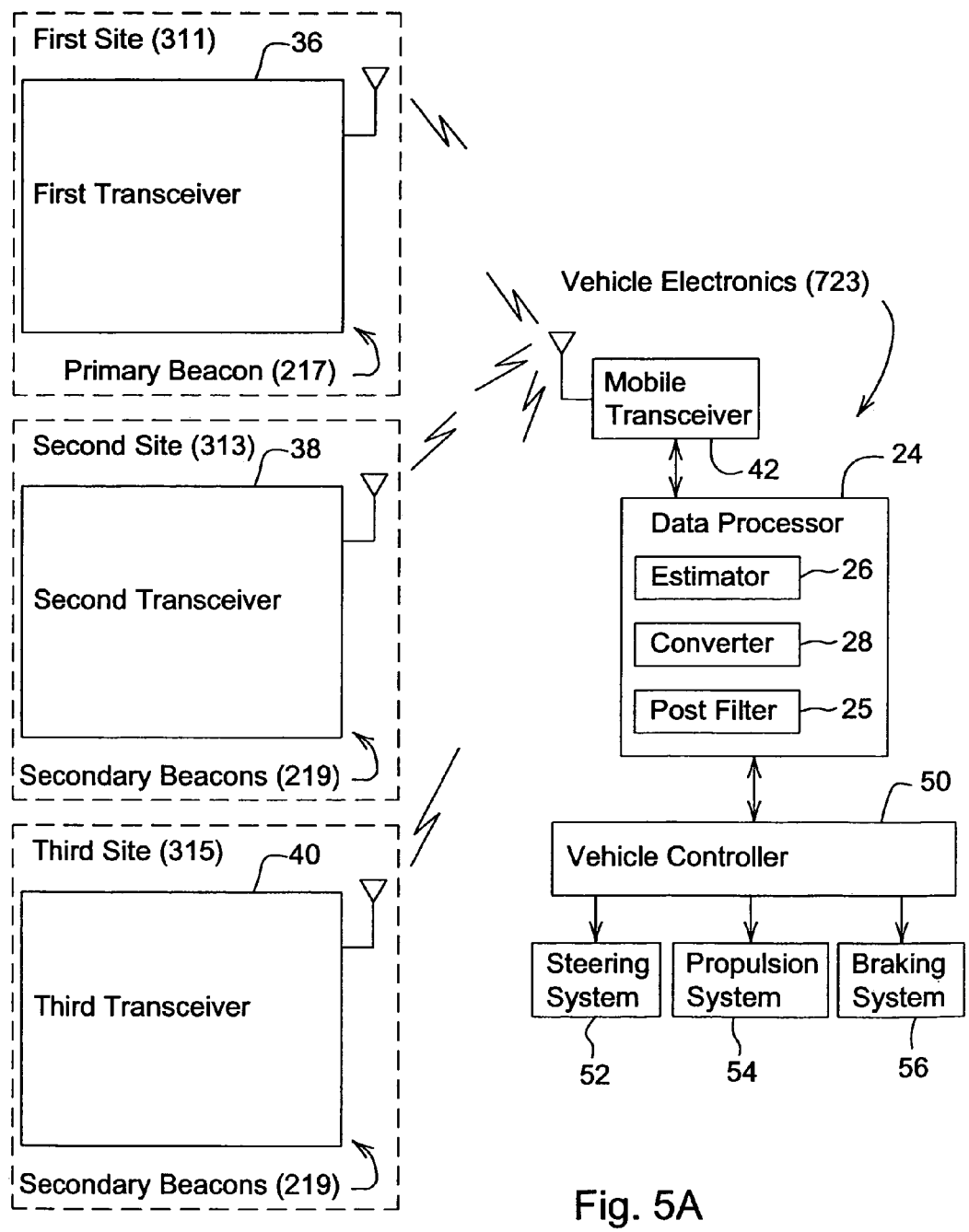
FIG. 5A is a block diagram of the third embodiment of the local positioning system during an operational stage.
Figure 5B:
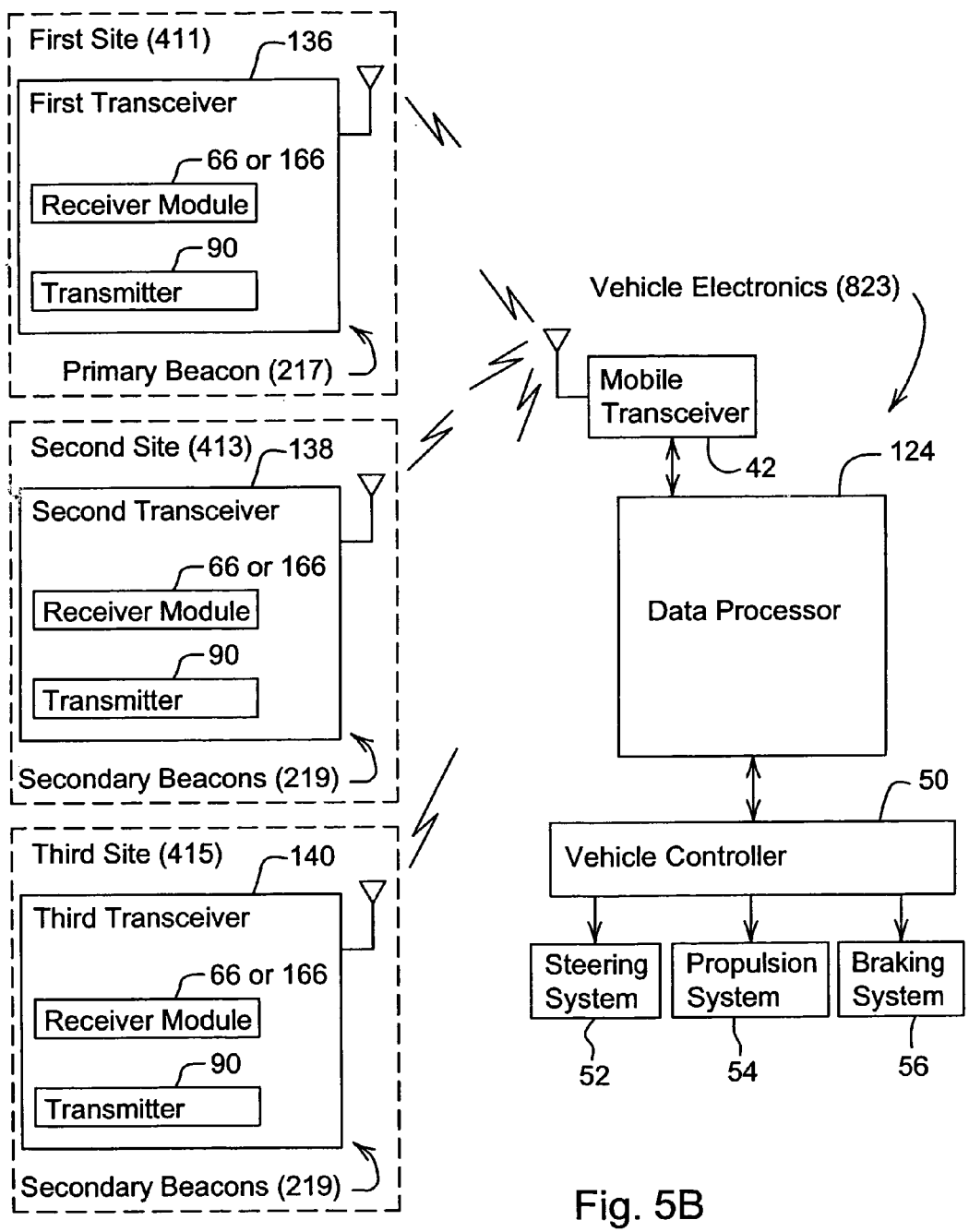
FIG. 5B is a block diagram of the fourth embodiment of the local positioning system during an operational stage.

Once the locations (e.g., coordinates) of the first site 311, second site 313, and the third site 315 have been established in a configuration stage in FIG. 2A, those established locations of the sites are referenced or used in an operational stage to estimate a location (e.g., coordinates) of a mobile vehicle in the work area in FIG. 5A.

Figure 6A:
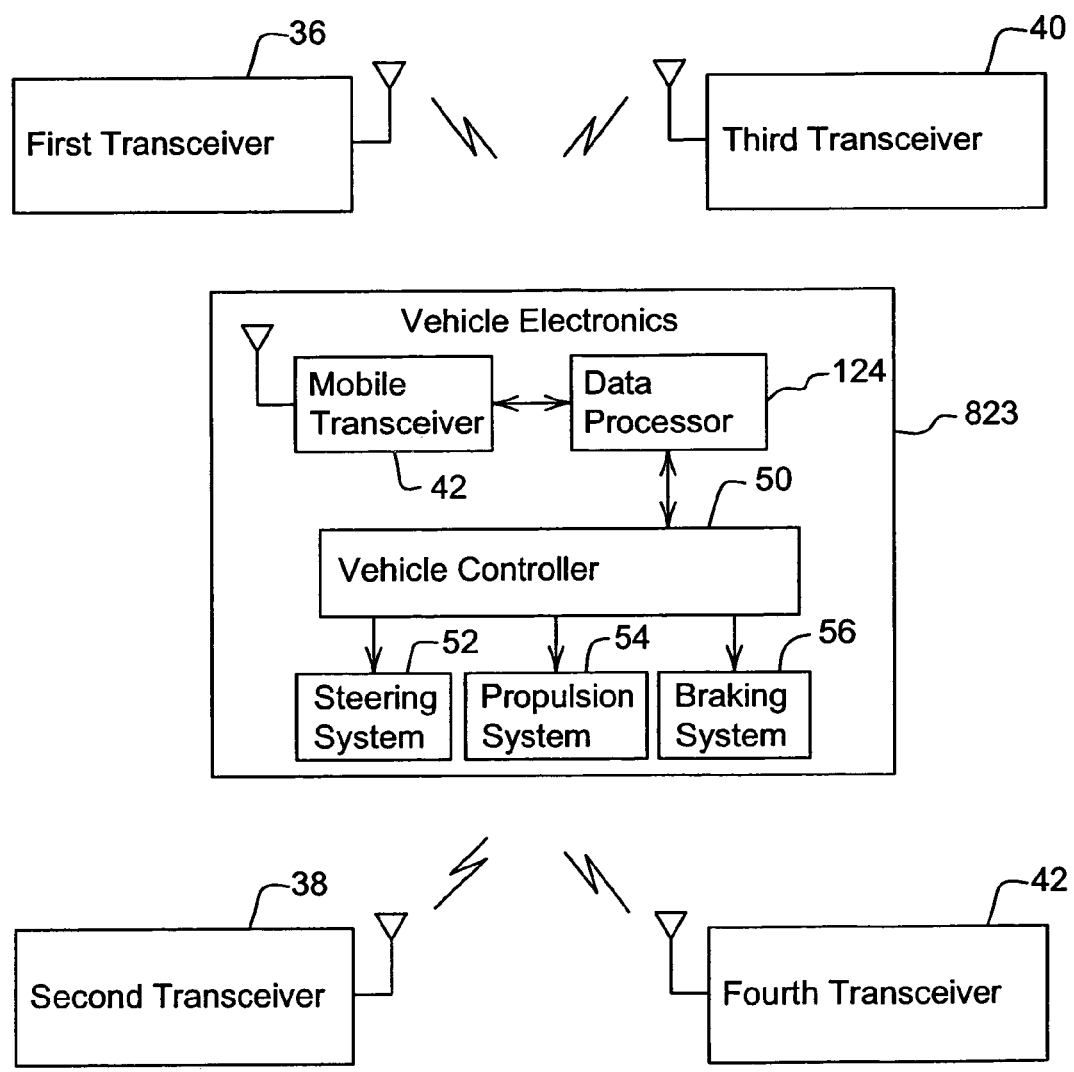
FIG. 6A is a block diagram of the fifth embodiment of the local positioning system during an operational stage.
Figure 6B:
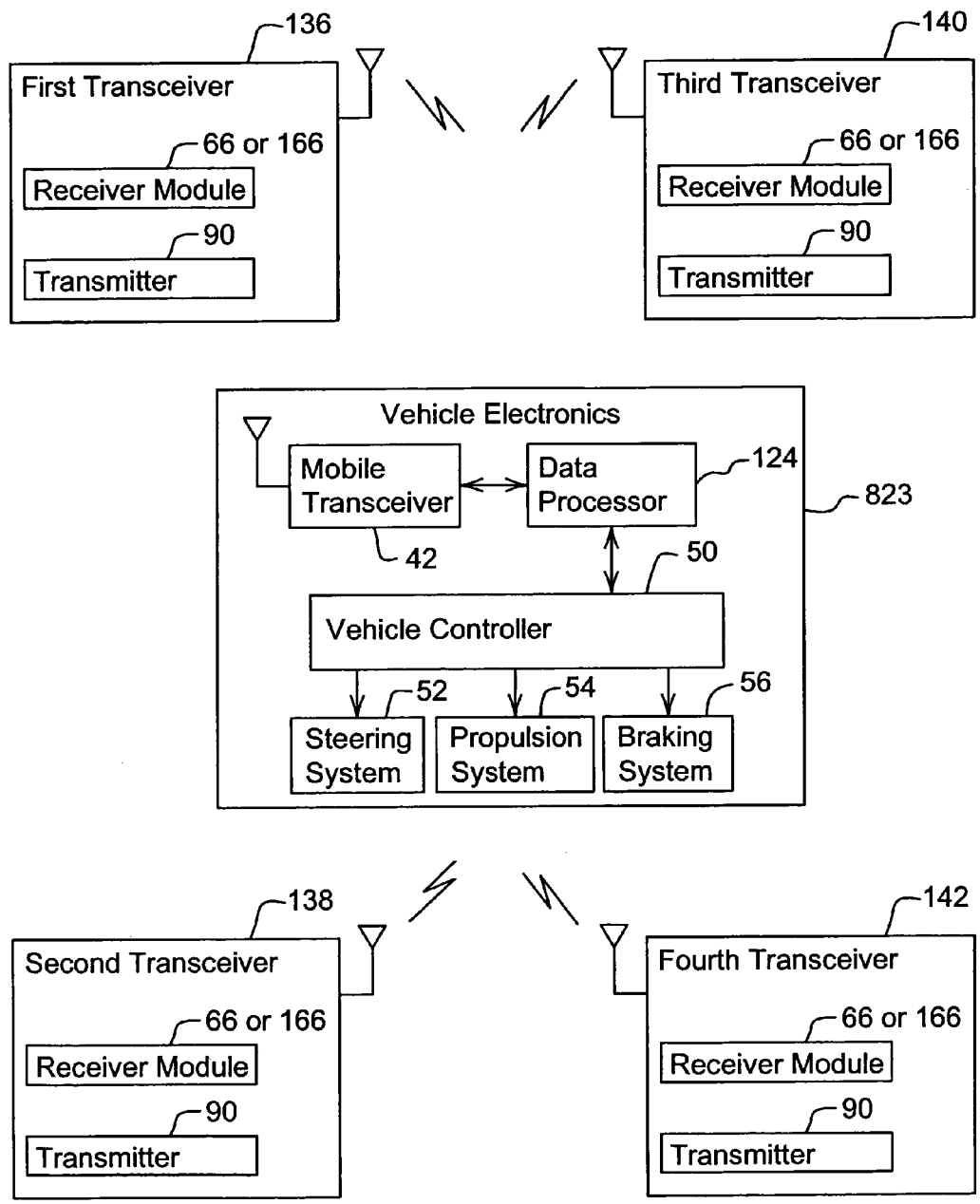
FIG. 6B is a block diagram of the sixth embodiment of the local positioning system during an operational stage.

The vehicle electronics 823 of FIG. 6A and FIG. 6B are substantially the same or the equivalent of that described in FIG. 5B. Once the locations (e.g., coordinates) of the first transceiver 36, second transceiver 38, the third transceiver 40, and fourth transceiver 42 (or their associated antennas) have been established in a configuration stage in FIG. 3A, those established reference locations of the transceiver are referenced or used in an operational stage to estimate a location (e.g., coordinates) of a mobile vehicle in the work area in FIG. 6A. Similarly, once the locations (e.g., coordinates) of the first transceiver 136, second transceiver 138, the third transceiver 140, and fourth transceiver 142 (or their associated antennas) have been established in a configuration stage in FIG. 3B, those established locations of the transceiver are referenced or used in an operational stage to estimate a location (e.g., coordinates) of a mobile vehicle in the work area in FIG. 6B.

Figure 7:
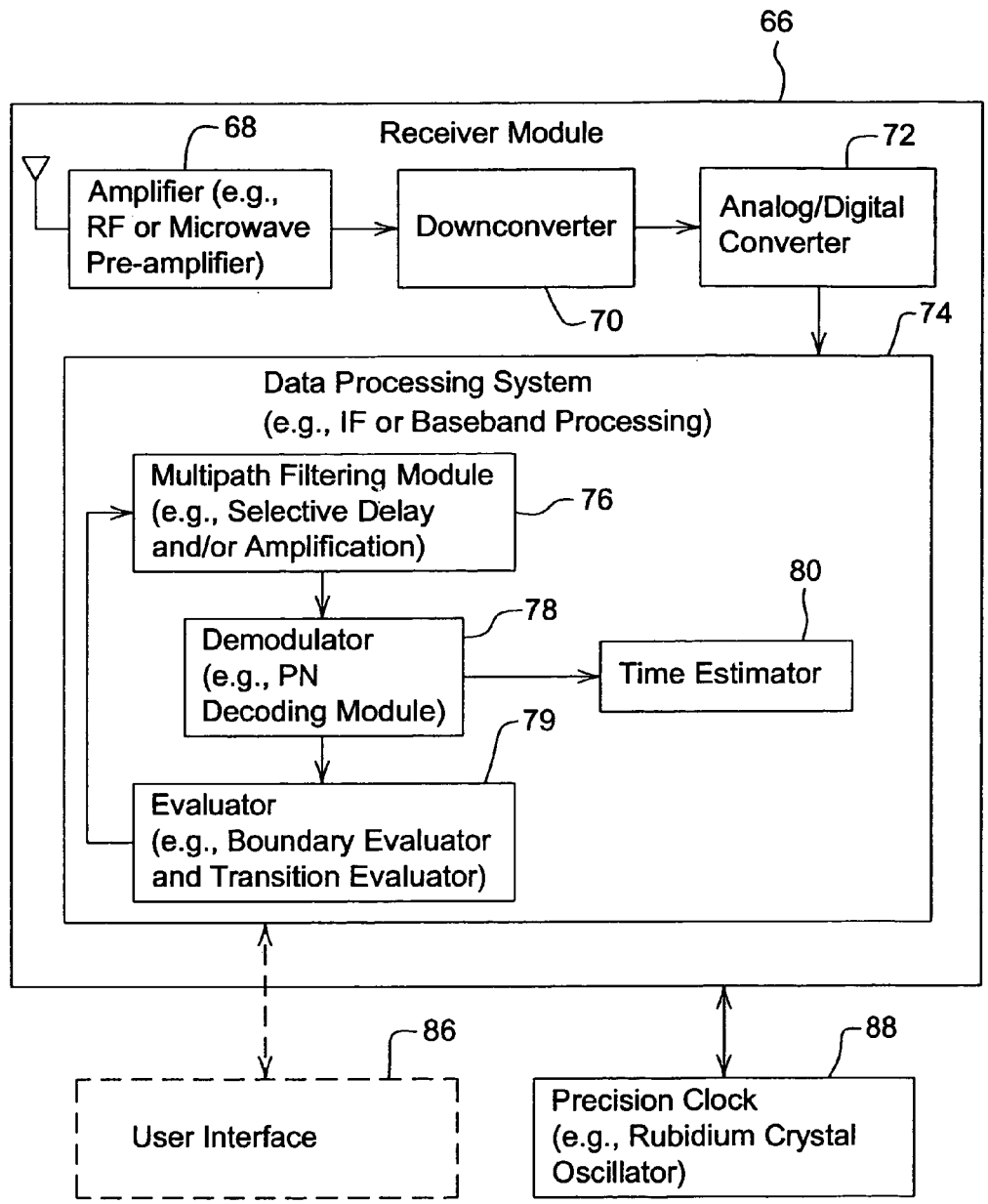
FIG. 7 is a block diagram of one embodiment of a receiver module that may be used in any of the local positioning systems of FIG. 1A through FIG. 6B, inclusive.

FIG. 7 provides one possible embodiment for a receiver module 66 that may be applied to the receivers of FIG. 1B and FIG. 4B or the transceivers of FIG. 2B, FIG. 3B, FIG. 5B, and FIG. 6B, for example. The receiver module 66 comprises an amplifier 68 coupled to a downconverter 70. The downconverter 70 is coupled to an analog-to-digital converter 72. In turn, the analog-to-digital converter 72 is coupled to a data processing system 74.

The amplifier 68 may comprise a radio frequency or microwave pre-amplifier, for example.

In one embodiment, the data processing system 74 includes a multi-path filtering module 76 coupled to a demodulator 78. In turn, the demodulator 78 is associated with an evaluator 79 and a time estimator 80. The time estimator 80 may provide a temporal indicator of a distance between a source of a transmitted signal and the receiver module 66 (or their associated antennas). The source of the transmitted signal may comprise a survey antenna 21 or test equipment for the configuration stage, whereas the source of the transmitted signal may represent the vehicle or vehicle electronics for the operational stage.

The receiver module 66 may receive a clock signal from a precision clock 88 to assist in synchronization or alignment with the transmitter or transceiver that transmits a transmission signal. The precision clock may comprise a rubidium crystal oscillator or another precision clock.

In one embodiment, an optional user interface 86 may be coupled to the receiver module 66 to program it. The user interface 86 is shown as dashed lines to indicate that it is optional, and need not be present. For example, the optional user interface 86 may be used to set parameters of the multipath filtering module 76, other filter settings, or other data processing settings of the data processing system 74.

The transmitted signal may be received as a multipath signal at the receiver module 66. The multipath signal comprises a direct or line-of-sight signal and one or more reflections from nearby objects. The multipath signal has a phase error that depends upon the relative phase offset and relative signal strength between the direct signal and the reflected signal. The resultant multipath error in the receiver may effect the code phase of the code tracking loop in the receiver module 66 and the carrier phase of the carrier tracking loop of the receiver module 66.

In one embodiment, the carrier may be modulated with a pseudo-random noise code or modulation code. The carrier phase is the fractional phase angle of the incoming carrier wave, whereas the code phase is the factional phase of the pseudo-random noise code. A chip refers to a single bit or symbol of information of the pseudo-random noise code. A chip duration refers to the length of time for the transmission of a single bit or symbol.

An evaluator 79 may evaluate the chip transition associated with the code tracking loop to reduce multipath error. Further, the evaluator 79 may evaluate a chip boundary associated with the code tracking loop to adjust a phase of the carrier tracking loop of the receiver module 66. The direct signal transmitted has a desired code phase offset and a desired carrier phase offset, whereas the reflection signal of lower amplitude has an interfering code phase offset and an interfering carrier phase offset. Where the carrier is modulated with a pseudo-random noise code or another modulation code, one or more correlators may be used to decode or demodulate the carrier based on the desired code phase offset and the desired carrier phase offset.

The evaluator 79 determines one or more of the following: (1) the timing associated with a transition between an earlier chip and a later chip; (2) the timing associated with a trailing edge of an earlier chip; (3) the timing associated with the leading edge of a later chip; (4) the timing of a chip boundary between two adjacent chips, bits, symbols, or transmitted pulses, (5) the relative amplitudes of each pulse within a received pulse train of modulation data, (6) consistency or deviation of temporal spacing between each pulse boundary or chip boundary, (7) consistency or deviation of temporal spacing between each pulse transition or chip transition, (8) consistency or deviation of temporal spacing between each pulse trailing edge, and (9) consistency or deviation of temporal spacing between each pulse leading edge. If one later chip, later transition or later leading edge is inconsistent with an earlier (e.g., immediately preceding) chip, earlier transition, or earlier leading edge, the evaluator 79 may send an evaluation signal or disparity signal to the multipath filtering module 76.

In one example, the multipath filtering module 76 may selectively apply delay (less than a chip duration) to the nonconforming chip or pulse train. For example, the multipath filtering module 76 may apply delay ranging from approximately one-ten thousandth of a chip duration to one-tenth of a chip duration. This delay is selected to properly align the nonconforming chip or pulse train to the remainder of the pulse train or to properly align the nonconforming chip or pulse train the phase or timing of the locally generated pseudo-noise code or locally generated code to allow proper correlation and decoding of the receive signal. It should be noted that if the code delay or interfering code offset is greater than one chip, the correlator or demodulator may generally regard the reflected signal as uncorrelated with the direct signal without the need for additional filtering.

In another embodiment, the multipath filtering module 76 may selectively apply delay (less than a chip duration), amplitude weighting, or both to the nonconforming chip or pulse train. For example, the multipath filtering module 76 may apply delay ranging from approximately one-ten thousandth of a chip duration to one-tenth of a chip duration and amplification to the chip, or certain incremental windows within the chip. An incremental window is a narrow time slot that has an incremental duration of equal to or less than one chip duration, and such incremental duration may be variable or fixed. The incremental window delay and incremental window amplification (or attenuation) is selected to properly align the nonconforming chip or pulse train to the remainder of the pulse train or to properly align the nonconforming chip or pulse train the phase or timing of the locally generated pseudo-noise code or locally generated code to allow proper correlation and decoding. It should be noted that if the code delay or interfering code offset is greater than one chip, the correlator or demodulator may generally regard the reflected signal as uncorrelated with the direct signal without the need for additional filtering.

In an alternative embodiment, where a multipath signal is received during an incremental window (e.g., recognized by lesser signal amplitude or lesser signal-to-noise ratio than the direct path waveform) or series of incremental windows and adjusted or filtered, the multipath filtering module 76 may record or track the incremental window delay applied to provide a generally proportional adjustment to a bias delay (e.g., reduction of the propagation time to correlate to that of the direct path) associated with processing of the multipath signal in the receiver module 66.

Figure 8:
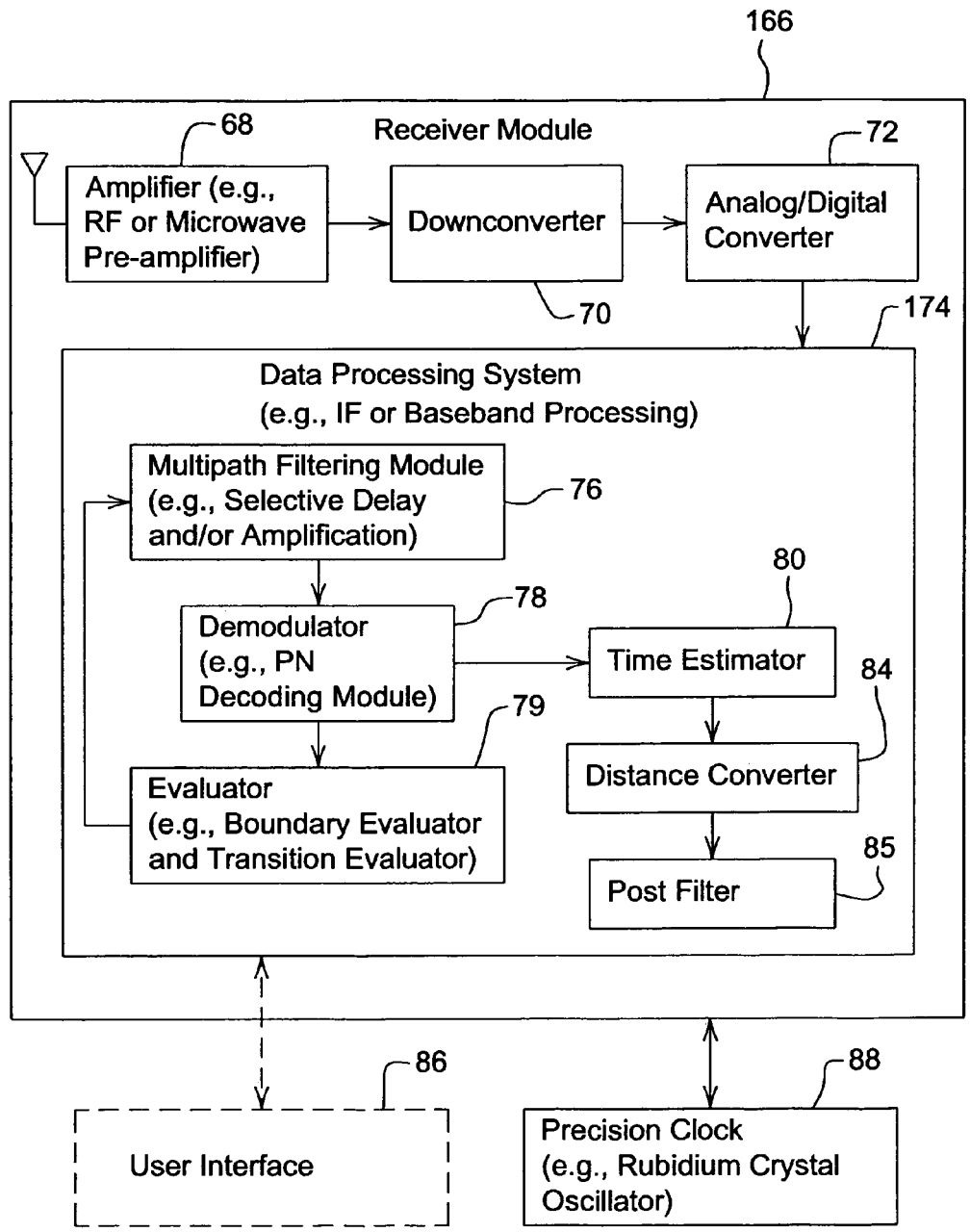
FIG. 8 is a block diagram of another embodiment of a receiver module that may be used in any of the local positioning systems of FIG. 1A through FIG. 6B, inclusive.

The receiver module 166 of FIG. 8 is similar to the receiver module 66, except for the data processing system 174. The data processing system 174 of FIG. 8 further includes a distance converter 84 and a post filter 85, for example. The time estimator 80 is substantially equivalent to the estimator 26 of FIG. 1A, except that the time estimator 80 is associated with or incorporated into the receiver module 166. The distance converter 84 is substantially equivalent to the converter 28 of FIG. 1A, except that the distance converter 84 is associated with or incorporated into the receiver module 166. The post filter 85 is substantially equivalent to the post filter 24 of FIG. 1A, except that the post filter 95 is associated with or incorporated into the receiver module 166. The post filter 84 may perform filtering on the decoded signal after demodulation or intermediate frequency processing, for instance.

Figure 9:
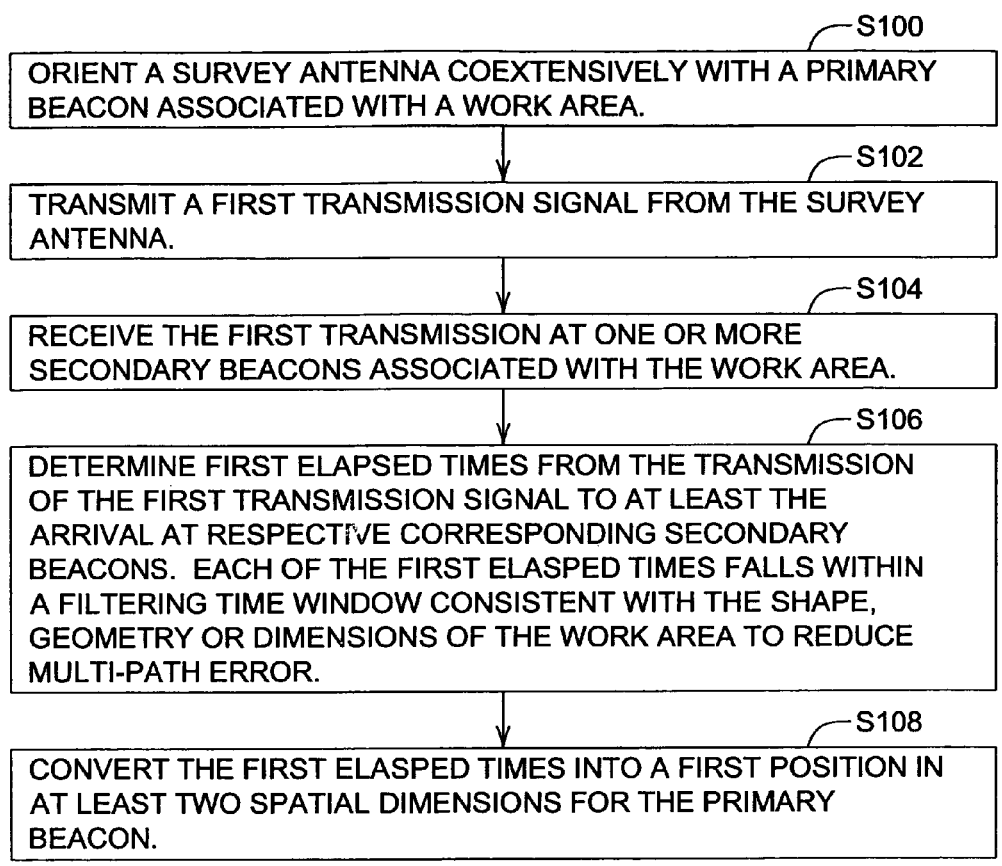
FIG. 9 is a flow chart of a method for determining a local position during a configuration stage.

FIG. 9 is a flow chart of a method for determining a position of the beacon sites in a configuration stage. The method of FIG. 9 applies to configure the local positioning system prior to initial use, for example. The method of FIG. 9 begins in step S100.

In step S100, a survey antenna is oriented coextensively with a primary beacon 111 associated with a work area. In one example, a user positions the survey antenna associated with a mobile transmitter 22 or transceiver in approximately the same position as a beacon antenna associated with a beacon site. In another example, the user disconnects the beacon antenna at a beacon site and temporarily couples the mobile transmitter 22 or transceiver to the beacon antenna to determine the position (e.g., geographic coordinates) of the beacon.

In step S102, a mobile transmitter 22 or transceiver transmits a first transmission signal from the survey antenna. The survey antenna may comprise a separate antenna or the beacon antenna associated with any beacon site.

In step S104, a first transmission is received at one or more secondary beacons 113 associated with the work area. For example, a receiver or a transceiver receiver of the secondary beacons 113 receives the first transmission.

In step S106, a data processor 24 or estimator 26 determines first elapsed times from the transmission of the first transmission signal to at least the arrival at respective corresponding secondary beacons 113. Each of the first elapsed times falling within a filtering time window consistent with shape, geometry or dimensions of the work area (and the orientations and locations of the beacons associated therewith) to reduce multi-path error. For example, the filtering time window may use the maximum physical separation between sets of beacons to derive a maximum threshold time. If certain measured elapsed times, indicative of the position of the vehicle, exceed the maximum threshold time, those measured elapsed times are rejected as erroneous or the result of multipath reflections. In this way, the filtering window rejects measured elapsed times that would place the vehicle location outside of the work area, for instance.

In step S108, a data processor 24 or converter 28 converts the first elapsed times into a first position in at least two spatial dimensions for the primary beacon 111. The method of FIG. 9 may be repeated after orienting the survey antenna coextensively with a particular one of the secondary beacons to identify a second position of the particular secondary beacon, for example.

Figure 10:
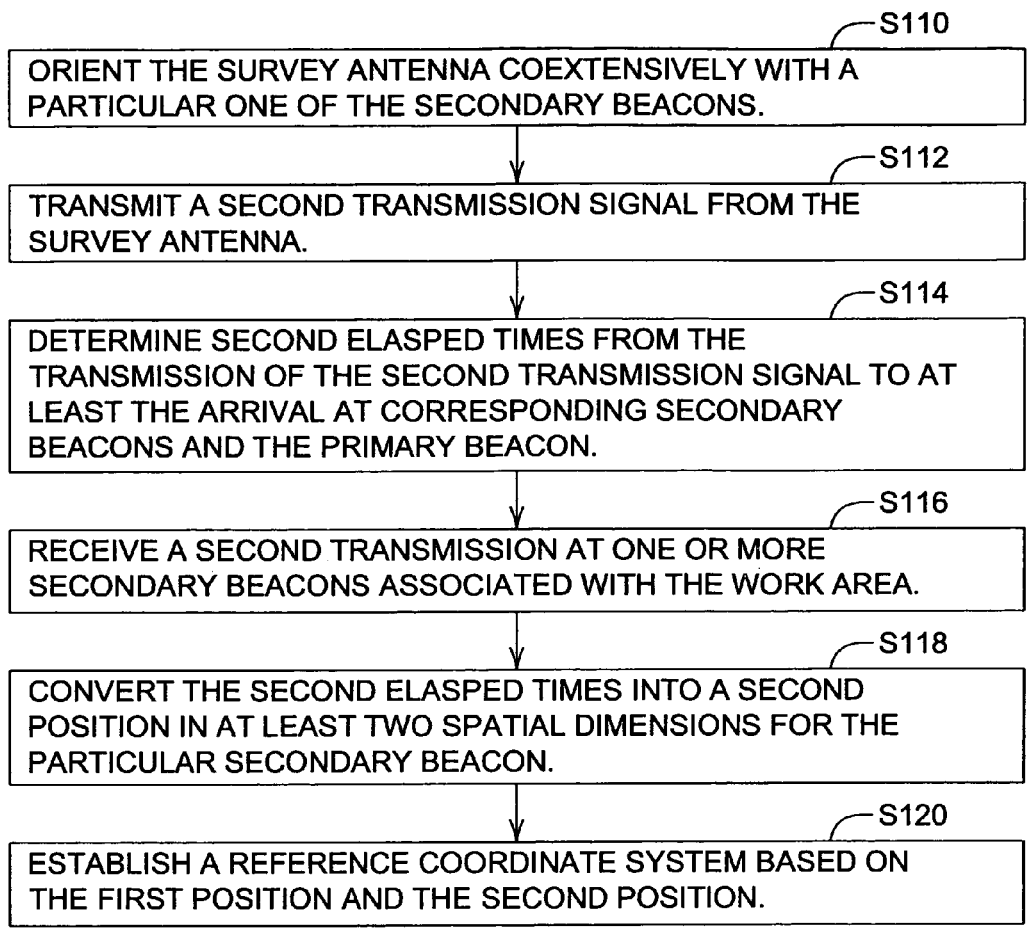
FIG. 10 is a flow chart of a method for determining a local position in association with the method of FIG. 9.

FIG. 10 is a flow chart of a method for determining a position of the beacon sites in associated with FIG. 9. The method of FIG. 10 may apply to configure the local positioning system after executing all or some of the steps of the method of FIG. 9. The method of FIG. 9 begins in step S110.

In step S110, a survey antenna is oriented coextensively with a particular one of the secondary beacons 113 associated with a work area. In a first example, a user positions the survey antenna associated with a mobile transmitter 22 or transceiver in approximately the same position as a beacon antenna associated with a secondary beacon-site. In a second example, the user disconnects the beacon antenna from beacon electronics at a secondary beacon site and temporarily couples (as opposed to requiring such determination or calculation at the transmitting site of a transmission) the mobile transmitter 22 or mobile transceiver to the beacon antenna to determine the position (e.g., geographic coordinates) of the beacon. In the second example, the beacon antenna essentially serves as a temporary survey antenna. In a third example, a user disables the transmitter or receiver associated with the beacon with which the survey antenna is co-located to avoid overloading the front-end of the receiver or other problems.

In step S112, a mobile transmitter 22 or transceiver transmits a second transmission signal from the survey antenna. The survey antenna may comprise a separate antenna or the beacon antenna.

In step S114, a second transmission is received at one or more secondary beacons 113 associated with the work area. For example, a receiver or a transceiver receiver of the secondary beacons 113 receives the second transmission.

In step S116, a data processor 24 or estimator 26 determines second elapsed times from the transmission of the second transmission signal to at least the arrival at respective corresponding secondary beacons 113 and the primary beacon 111. Each of the second elapsed times falling within a filtering time window to reduce multi-path error.

In step S118, a data processor 24 or converter 28 converts the second elapsed times into a second position in at least two spatial dimensions for the primary beacon 111.

In step S120, the data processor 24 establishes a reference coordinate system based on the first position and the second position. During or prior to establishing the reference coordinate system, the data processor 24 may facilitate the user's refinement, modification, or approval of the first positions and second positions on a display or via a user interface. Accordingly, the user may independently verity the first position and the second position by survey, measurements or other tests and input or enter input-data to facilitate revision of at least one of the first position and the second position.

Following step S120, a data processor 24, path planner or mission planner may establish at least one of a path plan and a mission plan based on the guidance of the vehicle with respect to the reference coordinate system. Further, following step S120, a user may define the boundaries of the work area with respect to the coordinate system or the established reference locations of the beacons. The definition of the boundaries may be accomplished in accordance with several illustrative techniques, that may be applied separately, or cumulatively. Under a first technique, a survey antenna is mounted to the vehicle and associated with test equipment; the vehicle is driven around a perimeter of the area to define the perimeter (e.g., by a series of points or geographic coordinates referenced to the established reference locations or coordinate system). Under a second technique, a survey antenna is mounted to the vehicle and associated with test equipment; the vehicle is driven around interior perimeters of at least one of a keep-out area and a no-entry zone of the area to define such interior perimeters of the work area (e.g., by a series of points or geographic coordinates referenced to the established reference locations or coordinate system).

Figure 11:
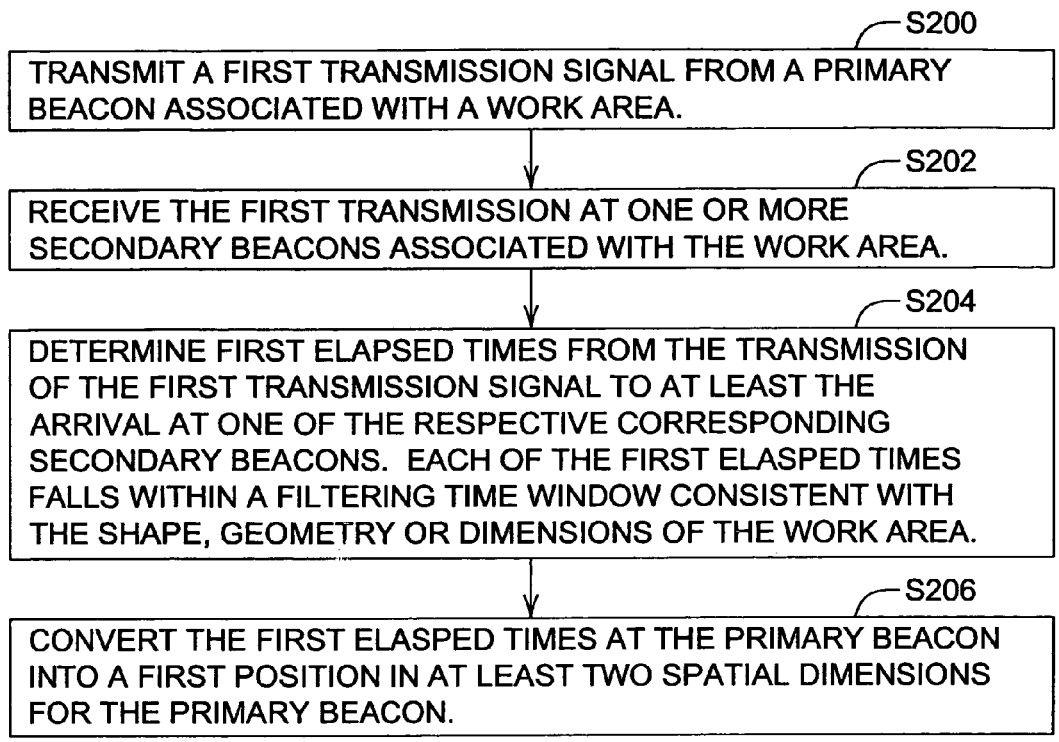
FIG. 11 is a flow chart of another method for determining a local position during a configuration stage.

FIG. 11 describes a method for determining the position of a transmitter or transceiver (or an antenna) associated with a primary beacon. The method of FIG. 11 begins in step S200.

In step, S200 a transmitter or transceiver transmits a first transmission signal from a primary beacon 111.

In step S202, a receiver or transceiver receives the first transmission at one or more secondary beacons 113 associated with the work area.

In step S204, an estimator 26 or data processor 24 determines first elapsed times from the transmission of the first transmission signal to at least the arrival at one of the respective corresponding secondary beacons 113. Each of the first elapsed times falling within a filtering time window consistent with shape, geometry or dimensions of the work area (and the orientations of the beacons associated therewith) to reduce multi-path error. For example, the filtering time window may use the maximum physical separation between sets of beacons to derive a maximum threshold time. If certain measured elapsed times, indicative of the position of the vehicle, exceed the maximum threshold time, those measured elapsed times are rejected as erroneous or the result of multipath reflections. In this way, the filtering window rejects measured elapsed times that would place the vehicle location outside of the work area, for instance.

In step S206, a converter 28 or data processor 24 converts the first elapsed times at the primary beacon 111 into a first position in at least two spatial dimensions for the primary beacon 111.

Figure 12:
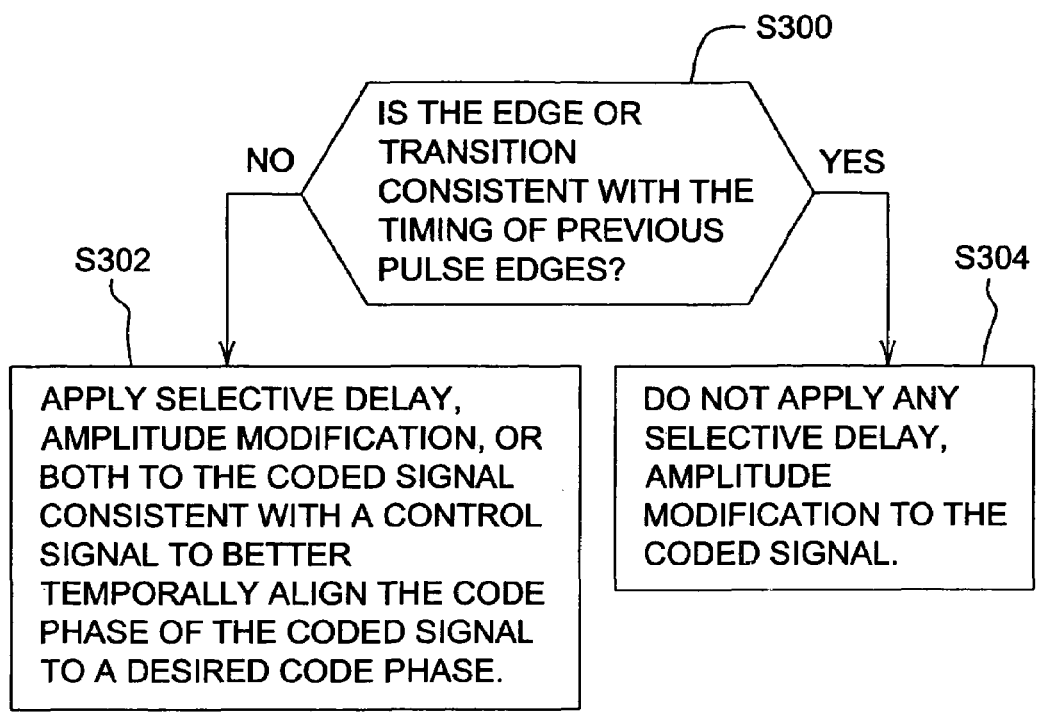
FIG. 12 is a flow chart of a method for reducing the effects of multipath propagation on location estimates of a vehicle in a work area.

FIG. 12 is a flow chart of a method for reducing the effects of multipath propagation on location estimates of a vehicle in a work area. The method of FIG. 12 begins in step S300.

In step S300, the evaluator 79 or data processing system (74 or 174) evaluates a transition or edge (e.g., a leading edge or a trailing edge) of a pulse or pulse train of a coded signal (e.g., a chip) to determine if the edge or transition is consistent with the timing of previous pulse edges, or portions of the pulse train. The evaluator 79 may evaluate the pulse over a fraction of the pulse width, pulse duration, or chip duration, which may be referred to as an evaluation window. In step S300, if the edge or transition is not consistent with the timing of previous pulse edges (e.g., does not occur at a uniform interval or in temporal or phase alignment with a locally generated coded signal), then the evaluator 79 or data processing system (74 or 174) sends a control signal to the multi-path filtering module 76 to modify the coded signal in step S302. However if the edge or transition is consistent with the timing of previous pulse edges (e.g., occurs at a substantially uniform interval or in temporal or phase alignment with a locally generated coded signal) then the method continues with step S304. A locally generated coded signal may represent a pseudo-random noise code modulated with a payload message (e.g., a timing pulse representative of the transmission time, arrival time or reception time at a beacon or the vehicle electronics).

In step S302, the multipath filtering module 76 or data processing system (74 or 174) applies selective delay, amplitude modification, or both to the coded signal consistent with the control signal to better temporally align the code phase of the coded signal to a desired code phase associated with one or more correlators or pseudo-noise code generators or other coded signal generators of the demodulator 78. In an alternate embodiment, the multipath filtering module 76 or data processing system (74 or 174) may provide selective delay, amplitude modification, or both to the baseband signal or intermediate frequency (IF) signal to better align the carrier phase of the received signal to the desired carrier phase.

The amplitude modification may attenuate narrow time slots or incremental windows of the received baseband or intermediate signal that appear to be multipath signals because of their lower amplitude than the direct path signal or that appear in a reserved time slot or guard band time slot, for example. Conversely, the amplitude modification may amplify time slots of the received baseband or intermediate signal that appear to be the direct signal because of their conformity to the timing of earlier pulse transitions, for example.

In one embodiment, although the carrier phase of the received signal may be better aligned or correlated to the desired carrier phase by adding selective delay to a narrow time slot or incremental window (e.g. a narrow time slot less than a chip) of the baseband, the selective delay may be modeled or otherwise regarded as a bias delay which (if material to the desired accuracy of the vehicle location) may be deducted from the a propagation time (or elapsed time) between the vehicle and a beacon in the operational stage to provide an accurate estimation of actual distance between the vehicle and the beacon. Similarly, the selective delay may be modeled or otherwise regarded as a bias delay which (if material to the desired accuracy of the vehicle location) may be deducted from the a propagation time (or elapsed time) between the test equipment and a beacon in the configuration stage to provide an accurate estimation of actual distance between the survey antenna of the test equipment and the beacon.

In step S304, the multipath filtering module 76 does not apply any selective delay, amplitude modification to the coded signal.

Figure 13:
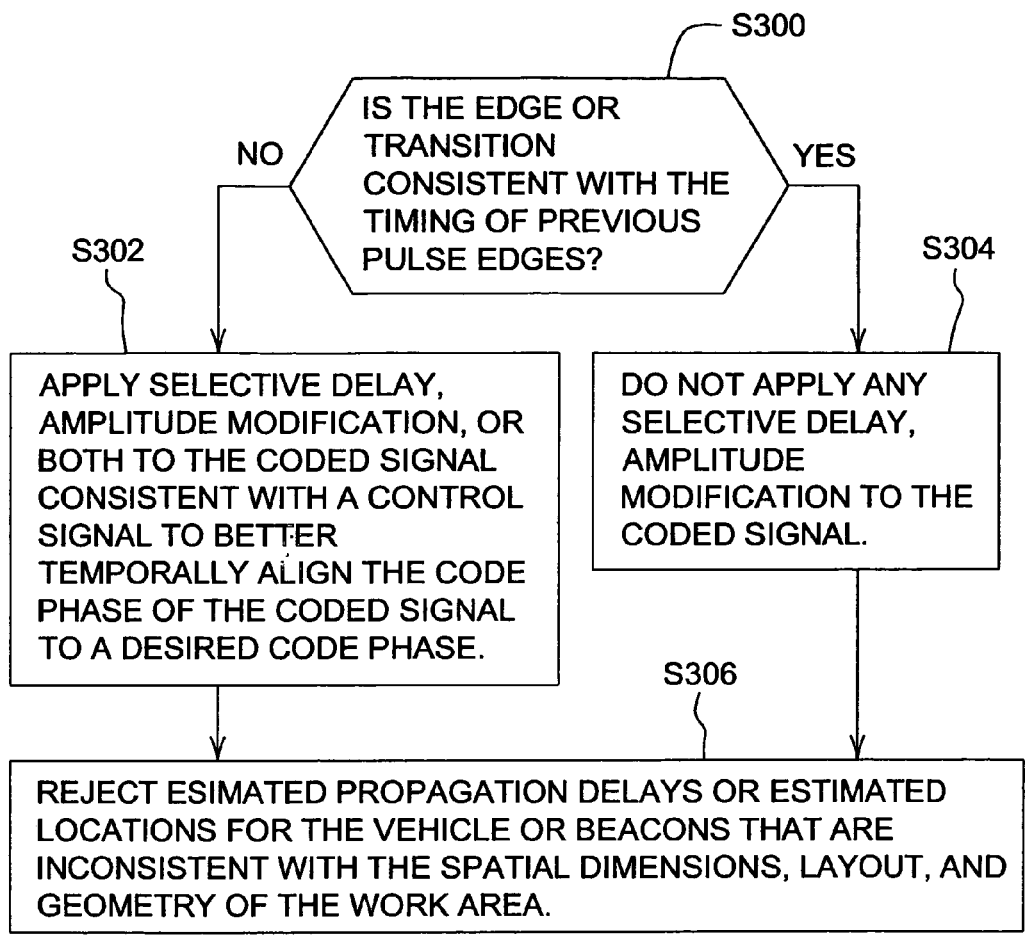
FIG. 13 is a flow chart of another method for reducing the effects of multipath propagation on location estimates of a vehicle in a work area.

FIG. 13 is a flow chart of another method for reducing the effects of multipath propagation on location estimates of a vehicle in a work area. The method of FIG. 13 is similar to the method of FIG. 12, except the method of FIG. 13 includes additional step S306. Like reference numbers indicate like elements.

Step S306 may follow step S302 or step S304. The post filter 25 rejects estimated propagation delays or estimated locations for the vehicle or beacons that are inconsistent with the spatial dimensions, layout, and geometry of the work area. For example, if a vehicle equipped with vehicle electronics is operating in a work area which is 300 meters wide, a multipath reflection that results in an estimated location consistent with a 600 meter width of the work area would be rejected by the post filter 25.

In one example of carrying out step S306, each of the elapsed times, one-way propagation times, or two-way propagation times between a beacon and a corresponding vehicle falls within a filtering time window consistent with shape, geometry or dimensions of the work area (and the orientations and locations of the beacons associated therewith) to reduce multi-path error. For example, the filtering time window may use the maximum physical separation between sets of beacons to derive a maximum threshold time. If certain measured elapsed times, indicative of the position of the vehicle, exceed the maximum threshold time, those measured elapsed times are rejected as erroneous or the result of multipath reflections. In this way, the filtering window rejects measured elapsed times that would place the vehicle location outside of the work area, for instance.

Having described the preferred embodiment, it will become apparent that various modifications can be made without departing from the scope of the invention as defined in the accompanying claims.

What is claimed is:

1. A method for configuring a local positioning system, the method comprising:
   orienting a survey antenna coextensively with a primary beacon associated with a work area;
   transmitting a first transmission signal from the survey antenna;
   receiving the first transmission at one or more secondary beacons associated with the work area;
   determining first elapsed times from the transmission of the first transmission signal to at least the arrival at respective corresponding secondary beacons, each of the first elapsed times falling within a filtering time window to reduce multi-path error; and
   converting the first elapsed times into a first position in at least two spatial dimensions for the primary beacon.

2. The method according to claim 1 further comprising:
   inputting a maximum dimensions of the work area;
   determining a maximum propagation time associated with the filtering time window based on at least one of the maximum dimensions and geometry of the work area.

3. The method according to claim 1 further comprising:
   determining a minimum propagation time associated with the filtering time window based on a reception of the first transmission exceeding a threshold signal-to-noise ratio, a threshold signal strength level or a threshold signal quality level at one or more of the secondary beacons.

4. The method according to claim 1 wherein the determining of the first elapsed times comprises outgoing propagation times from the first transmission to the respective secondary beacons plus incoming propagation times from second transmissions of derivative signals, based on the first transmission, to the survey antenna.

5. The method according to claim 1 further comprising:
   orienting the survey antenna coextensively with a particular one of the secondary beacons;
   transmitting a second transmission signal from the survey antenna;
   determining second elapsed times from the transmission of the second transmission signal to at least the arrival at corresponding secondary beacons and the primary beacon; and converting the second elapsed times into a second position in at least two spatial dimensions for the particular secondary beacon; and establishing a reference coordinate system based on the first position and the second position.

6. The method according to claim 5 further comprising:

establishing at least one of a path plan and a mission plan based on the guidance of the vehicle with respect to the reference coordinate system.

7. The method according to claim 5 further comprising:

presenting the first and second positions on a display to a user;

allowing the user to enter input data to facilitate revision of at least one of the first position and the second position.

8. The method according to claim 1 wherein the survey antenna comprises a beacon antenna of the beacon.

9. The method according to claim 1 further comprising disabling the transmitter or receiver associated with the beacon with which the survey antenna is co-located.

10. The method according to claim 1 further comprising:

mounting the survey antenna to a vehicle; and driving the vehicle around a perimeter of a work area to define the perimeter.

11. The method according to claim 1 further comprising:

mounting the survey antenna to a vehicle; and driving the vehicle around interior perimeters of at least one of a keep-out area and a no-entry zone within an interior of the work area.

12. The method according to claim 1 wherein the receiving further comprises:

determining whether the edge or transition of a coded signal associated with the received first transmisstion is consistent with a timing of previous pulse edges of the received first tranmission; and applying at least one of selective delay and amplitude modification or both to the coded signal to temporally align a code phase of the coded signal to a desired code phase.

13. The method according to claim 12 wherein the receiving further comprises:

rejecting estimated propagation delays or estimated locations outside of the filtering time window for the beacons that are inconsistent with the spatial dimensions, layout, and geometry of the work area.

14. The method according to claim 12 wherein the receiving further comprises:

rejecting estimated propagation delays or estimated locations outside of the filtering time window for the vehicle that are inconsistent with the spatial dimensions, layout, and geometry of the work area.

15. A method for configuring a local positioning system, the method comprising:

transmitting a first transmission signal from a primary beacon;

receiving the first transmission at one or more secondary beacons associated with the work area;

determining first elapsed times from the transmission of the first transmission signal to at least the arrival at one of the respective corresponding secondary beacons, each of the first elapsed times falling within a filtering time window; and converting the first elapsed times at the primary beacon into a first position in at least two spatial dimensions for the primary beacon.

16. The method according to claim 15 further comprising:

inputting a maximum dimensions of the work area;

determining a maximum propagation time associated with the filtering time window based on at least one of the maximum dimensions and geometry of the work area.

17. The method according to claim 15 further comprising:

determining a minimum propagation time of the filtering time window based on a reception of the first transmission exceeding a threshold signal-to-noise ratio, a threshold signal strength level, or a threshold signal quality level at one or more of the secondary beacons.

18. The method according to claim 15 wherein the determining of the first elapsed times comprises outgoing propagation times from the first transmission to the respective secondary beacons plus incoming propagation times from second transmissions of derivative signals, based on the first transmission, to the survey antenna.

19. The method according to claim 15 wherein the receiving further comprises:

determining whether the edge or transition of a coded signal associated with the received first transmission is consistent with a timing of previous pulse edges; and applying at least one of selective delay and amplitude modification or both to the coded signal to temporally align a code phase of the coded signal to a desired code phase.

20. The method according to claim 19 wherein the receiving further comprises:

rejecting estimated propagation delays or estimated locations outside of the filtering time window for the beacons that are inconsistent with the spatial dimensions, layout, and geometry of the work area.

21. The method according to claim 19 wherein the receiving further comprises:

rejecting estimated propagation delays or estimated locations outside of the filtering time window for the vehicle that are inconsistent with the spatial dimensions, layout, and geometry of the work area.

* * * * *